US012773811B2

(12) United States Patent
Springer

(10) Patent No.: US 12,773,811 B2
(45) Date of Patent: Oct. 27, 2026

(54) SYSTEM AND METHOD FOR USING A VOC FREE LOW RADIANT FLUX LED UV CURABLE COMPOSITION

(71) Applicant: MSI Coatings, Inc., Elbert, CO (US)

(72) Inventor: Matthew Kent Springer, Elbert, CO (US)

(73) Assignee: MSI Coatings, Inc., Elbert, CO (US)

( * ) Notice: Subject to any disclaimer, the term of this patent is extended or adjusted under 35 U.S.C. 154(b) by 66 days.

(21) Appl. No.: 18/765,305

(22) Filed: Jul. 7, 2024

(65) Prior Publication Data

US 2024/0359370 A1 Oct. 31, 2024

Related U.S. Application Data

(63) Continuation of application No. 18/238,608, filed on Aug. 28, 2023, which is a continuation of application (Continued)

(51) Int. Cl.
*C08J 3/28* (2006.01)
*B29C 35/08* (2006.01)
(Continued)

(52) U.S. Cl.
CPC ...... *B29C 35/0805* (2013.01); *B29C 37/0067* (2013.01); *B29C 70/06* (2013.01); *B29C 73/02* (2013.01); *B32B 3/12* (2013.01); *B32B 7/12* (2013.01); *B32B 15/10* (2013.01); *B32B 15/20* (2013.01); *B32B 21/042* (2013.01); *B32B 21/06* (2013.01); *B32B 21/14* (2013.01); *C08J 3/24* (2013.01); *C08J 3/28* (2013.01); *C08J 5/04* (2013.01); *C09D 5/18* (2013.01);
(Continued)

(58) Field of Classification Search
CPC ........... C08J 3/28; C09D 133/08; B05D 3/067
See application file for complete search history.

(56) References Cited

U.S. PATENT DOCUMENTS 2,815,889 A 12/1957 Stetz et al.
3,913,842 A 10/1975 Singer
(Continued)

FOREIGN PATENT DOCUMENTS

CA 2801503 A1 1/2012
EP 0456346 11/1991
(Continued)

OTHER PUBLICATIONS

International Search Report and Written Opinion for International (PCT) Application No. PCT/US2017/032430 mailed Jul. 31, 2017, 10 pages.
(Continued)

*Primary Examiner* — Brian M O'Hara
(74) *Attorney, Agent, or Firm* — Michael Best & Friedrich LLP

(57) ABSTRACT

The present invention generally relates to a system and method for using a volatile organic compound (VOC) free low radiant flux LED UV curable composition, and more particularly to unique and novel uses of the composition such as one or two or more of a fire retardant, clear coat, composite material, resin, top coat, improved holdout coating, a sealant coat, and combinations of the same.

33 Claims, 12 Drawing Sheets

600

Related U.S. Application Data

No. 16/425,400, filed on May 29, 2019, now Pat. No. 11,738,481, which is a continuation of application No. 15/593,985, filed on May 12, 2017, now Pat. No. 10,307,940.

(60) Provisional application No. 62/452,093, filed on Jan. 30, 2017, provisional application No. 62/430,125, filed on Dec. 5, 2016, provisional application No. 62/413,199, filed on Oct. 26, 2016, provisional application No. 62/382,968, filed on Sep. 2, 2016, provisional application No. 62/335,823, filed on May 13, 2016.

(51) Int. Cl.

| | |
|---|---|
| ***B29C 37/00*** | (2006.01) |
| ***B29C 70/06*** | (2006.01) |
| ***B29C 73/02*** | (2006.01) |
| ***B32B 3/12*** | (2006.01) |
| ***B32B 7/12*** | (2006.01) |
| ***B32B 15/10*** | (2006.01) |
| ***B32B 15/20*** | (2006.01) |
| ***B32B 21/04*** | (2006.01) |
| ***B32B 21/06*** | (2006.01) |
| ***B32B 21/14*** | (2006.01) |
| ***C08J 3/24*** | (2006.01) |
| ***C08J 5/04*** | (2006.01) |
| ***C09D 5/18*** | (2006.01) |
| ***C09D 133/08*** | (2006.01) |
| *B05D 3/06* | (2006.01) |
| *B05D 5/00* | (2006.01) |
| *B29C 37/02* | (2006.01) |
| *B29K 105/06* | (2006.01) |
| *B29K 309/08* | (2006.01) |
| *B29L 31/30* | (2006.01) |

(52) U.S. Cl.

CPC ............ *C09D 133/08* (2013.01); *B05D 3/067* (2013.01); *B05D 5/00* (2013.01); *B29C 2035/0827* (2013.01); *B29C 37/02* (2013.01); *B29K 2105/06* (2013.01); *B29K 2309/08* (2013.01); *B29L 2031/3097* (2013.01); *B32B 2250/02* (2013.01); *B32B 2255/08* (2013.01); *B32B 2255/26* (2013.01); *B32B 2262/101* (2013.01); *B32B 2262/106* (2013.01); *B32B 2307/3065* (2013.01); *B32B 2603/00* (2013.01); *B32B 2605/08* (2013.01); *B32B 2605/12* (2013.01); *B32B 2605/18* (2013.01)

(56) References Cited

U.S. PATENT DOCUMENTS

| | | | | |
|---|---|---|---|---|
| 4,181,752 | A | 1/1980 | Martens et al. | |
| 4,591,522 | A | 5/1986 | Kang et al. | |
| 4,879,320 | A | 11/1989 | Hastings | |
| 5,217,654 | A | 6/1993 | Buckley | |
| 5,395,862 | A | 3/1995 | Neckers et al. | |
| 5,451,343 | A | 9/1995 | Neckers et al. | |
| 5,514,519 | A | 5/1996 | Neckers | |
| 5,606,171 | A | 2/1997 | Neckers et al. | |
| 5,623,080 | A | 4/1997 | Neckers et al. | |
| 5,639,802 | A | 6/1997 | Neckers et al. | |
| 5,677,107 | A | 10/1997 | Neckers | |
| 5,717,217 | A | 2/1998 | Neckers et al. | |
| 5,891,292 | A | 4/1999 | Goodman et al. | |
| 5,942,554 | A | 8/1999 | Ren et al. | |
| 5,955,002 | A | 9/1999 | Neckers et al. | |
| 5,955,569 | A | 9/1999 | Dujari et al. | |
| 5,998,496 | A | 12/1999 | Hassoon et al. | |
| 6,153,663 | A | 11/2000 | Chen et al. | |
| 6,166,233 | A | 12/2000 | Neckers et al. | |
| 6,200,646 | B1 | 3/2001 | Neckers et al. | |
| 6,211,262 | B1 | 4/2001 | Mejiritski et al. | |
| 6,309,797 | B1 | 10/2001 | Grinevich et al. | |
| 6,318,996 | B1 | 11/2001 | Melikechi et al. | |
| 6,387,981 | B1 | 5/2002 | Zhang et al. | |
| 6,433,035 | B1 | 8/2002 | Grinevich et al. | |
| 6,461,691 | B1 | 10/2002 | Taylor et al. | |
| 6,479,217 | B1 | 11/2002 | Grinevich et al. | |
| 6,510,967 | B1 | 1/2003 | DeSimone | |
| 6,551,710 | B1 | 4/2003 | Chen et al. | |
| 6,586,494 | B2 | 7/2003 | Mejiritski et al. | |
| 6,838,177 | B2 | 1/2005 | Fenn et al. | |
| 6,894,084 | B2 * | 5/2005 | Kovar ................ | C08G 18/6715 427/508 |
| 6,933,020 | B2 | 8/2005 | Dove et al. | |
| 7,204,392 | B2 | 4/2007 | Kwasny et al. | |
| 7,268,172 | B2 | 9/2007 | Bach et al. | |
| 7,273,530 | B2 * | 9/2007 | Flosbach ............. | B29C 35/0805 156/230 |
| 7,399,793 | B2 * | 7/2008 | Braun ................ | C08F 290/141 427/508 |
| 7,466,415 | B2 | 12/2008 | Gibson et al. | |
| 7,510,746 | B2 | 3/2009 | Loeffler et al. | |
| 7,547,735 | B1 | 6/2009 | Konarski et al. | |
| 7,553,925 | B2 | 6/2009 | Bojkova | |
| 7,704,564 | B2 | 4/2010 | DeRegge et al. | |
| 8,105,504 | B2 | 1/2012 | Gerster et al. | |
| 8,192,673 | B2 | 6/2012 | Bowman et al. | |
| 8,227,050 | B1 | 7/2012 | O'Neil | |
| 8,403,177 | B2 | 3/2013 | Kwasny | |
| 8,414,981 | B2 | 4/2013 | Iezzi et al. | |
| 8,513,321 | B2 | 8/2013 | Martin et al. | |
| 8,528,837 | B2 | 9/2013 | Kwasny | |
| 8,796,348 | B2 | 8/2014 | Slark et al. | |
| 8,828,176 | B2 | 9/2014 | Powers et al. | |
| 8,846,777 | B2 | 9/2014 | Bowman et al. | |
| 8,864,493 | B2 | 10/2014 | Leslie-Martin et al. | |
| 8,901,198 | B2 | 12/2014 | Kania et al. | |
| 8,906,468 | B2 | 12/2014 | Bowman et al. | |
| 8,962,709 | B2 | 2/2015 | Bowman et al. | |
| 9,144,816 | B2 | 9/2015 | Lewis et al. | |
| 9,493,292 | B2 | 11/2016 | Kwasny | |
| 9,598,607 | B2 | 3/2017 | Komarova et al. | |
| 9,708,515 | B2 | 7/2017 | Clark et al. | |
| 10,307,940 | B2 | 6/2019 | Springer | |
| 12,492,319 | B2 * | 12/2025 | Wang .................. | C09D 133/08 |
| 2001/0014700 | A1 | 8/2001 | Kwasny | |
| 2002/0193460 | A1 | 12/2002 | Kovar et al. | |
| 2003/0109595 | A1 | 6/2003 | Okada et al. | |
| 2004/0002559 | A1 | 1/2004 | Troutman et al. | |
| 2005/0095371 | A1 | 5/2005 | Braun et al. | |
| 2005/0170101 | A1 | 8/2005 | Ramsey | |
| 2005/0271824 | A1 | 12/2005 | Loeffler et al. | |
| 2006/0025522 | A1 | 2/2006 | Johnson et al. | |
| 2006/0083864 | A1 * | 4/2006 | Lindell .............. | C08F 290/046 427/508 |
| 2006/0084713 | A1 | 4/2006 | Bach et al. | |
| 2006/0154082 | A1 | 7/2006 | Miller et al. | |
| 2006/0191623 | A1 | 8/2006 | Lutz et al. | |
| 2007/0205528 | A1 | 9/2007 | Patel et al. | |
| 2007/0284390 | A1 | 12/2007 | Wang | |
| 2008/0025942 | A1 | 1/2008 | Weiss et al. | |
| 2008/0152829 | A1 | 6/2008 | Dean et al. | |
| 2008/0314500 | A1 | 12/2008 | Boers et al. | |
| 2009/0047546 | A1 | 2/2009 | Bowman et al. | |
| 2009/0188559 | A1 * | 7/2009 | Nesbitt .................. | H10F 19/80 977/773 |
| 2009/0270528 | A1 | 10/2009 | Bowman et al. | |
| 2010/0056722 | A1 | 3/2010 | Thomas et al. | |
| 2010/0304338 | A1 | 12/2010 | Cramer et al. | |
| 2011/0003080 | A1 | 1/2011 | Echizen et al. | |
| 2011/0097481 | A1 | 4/2011 | Bowman et al. | |
| 2012/0256338 | A1 | 10/2012 | Bowman et al. | |
| 2013/0126073 | A1 | 5/2013 | Kenney | |
| 2013/0216838 | A1 | 8/2013 | Komarova et al. | |
| 2013/0224495 | A1 | 8/2013 | Gan et al. | |
| 2013/0277890 | A1 | 10/2013 | Bowman et al. | |

(56) References Cited

U.S. PATENT DOCUMENTS

| | | | |
|---|---|---|---|
| 2014/0016733 A1 | 1/2014 | Kim et al. | |
| 2014/0060531 A1 | 3/2014 | Brambilla | |
| 2014/0186541 A1 | 7/2014 | Clark et al. | |
| 2014/0191445 A1 | 7/2014 | Rist et al. | |
| 2014/0234632 A1 | 8/2014 | Nolte et al. | |
| 2015/0005408 A1 | 1/2015 | Lindekens et al. | |
| 2015/0009456 A1 | 1/2015 | Powers et al. | |
| 2015/0239007 A1 | 8/2015 | Selwyn | |
| 2016/0002475 A1 | 1/2016 | Potthoff et al. | |
| 2016/0075105 A1 | 3/2016 | Lamberty et al. | |
| 2017/0326761 A1* | 11/2017 | Springer | C08J 3/28 |
| 2019/0283282 A1 | 9/2019 | Springer | |
| 2023/0183477 A1 | 6/2023 | Tarkin-Tas et al. | |

FOREIGN PATENT DOCUMENTS

| | | |
|---|---|---|
| EP | 2740584 | 6/2014 |
| EP | 2821436 | 1/2015 |
| WO | 2010081713 | 7/2010 |
| WO | 2013126413 | 8/2013 |
| WO | 2015000761 | 1/2015 |
| WO | 2015036414 | 3/2015 |
| WO | 2017197277 | 11/2017 |

OTHER PUBLICATIONS

International Preliminary Report on Patentability for International (PCT) Application No. PCT/US2017/032430 mailed Nov. 13, 2018.

37 C.F.R. Part 25.853 (a) Amdt 25-116 Appendix F Part I (a)(1)(ii), 1965, 3 pages.

ASTM D638-10, "Standard Test Method for Tensile Properties of Plastics", 2015, 17 pages.

ASTM Designation D 790-03, "Standard Test Methods for Flexural Properties of Unreinforced and Reinforced Plastics and Electrical Insulating Materials", 2003, 11 pages.

BYK Additives & Instruments, Brief (Byk Regulatory Information - Extensive Form) Product Name: BYK-UV2576, Version 7.2, 19.08.2016, 6 pages.

Nason et al., "UV-Induced Frontal Polymerization of Multifunctional (Meth)acrylates", Macromolecules 2005, 38, 5506- 5512.

Van den Dungen, Eric, "Self-healing coatings based on thiol-ene chemistry", Mar. 2009, Dissertation University of Stellenbosch, 265 pages.

Husar, et al., "The formulator's guide to anti-oxcygen inhibition additives", Progress in Organic Coatings 77 (2014) 1789- 1798, 10 pages.

Owusu-Adom, et al., "Photopolymerization Behavior of Thiol-Acrylate Monomers in Clay Nanocomposites", Macromolecules 2009, 42, 3275-3284, 10 pages.

Zhang, et al., "Photopolymerization behavior and properties of highly branched polyester acrylate continaing thioether linkage used for UV curing coatings", Progress in Organic Coatings 71 (2011) 48-55, 8 pages.

Nebioglu, et al., "Advances in the Chemistry of Melamine Acrylate Oligomers", 2008, 7 pages.

Willard, "Formulating for Reactivity", Rad Tech e|5 2006 Technical Proceedings, 10 pages.

Arceneaux, Ph.D., "Field Applied UV Curable Floor Coatings", Need Date, 17 pages.

Dvorchak, "1K Uv-A Automotive Refinish; Clear Coats and Primers," Allnex, 2014, 31 pages.

Arceneaux, Ph.D., "Mitigation of Oxygen Inhibition in Uv Led, Uva and Low Intensity UV Cure", 2014 Allnex Belgium SA, 11 pages.

O'Brien, et al., "Impact of Oxygen on Photopolymerization Kinetics and Polymer Structure", Macromolecules 2006, 39, 2501-2506, 6 pages.

Arceneaux, Ph.D., "Mitigation of Oxygen Inhibition to Improve the Uv Led Cure Process", Allnex, 2015 Allnex Belgium SA, 20 pages.

Kiyoi, "Wood Coating with UV-LED Curing: A Focus on Heat", Radtech Report Issue 2, 2014, 6 pages.

Schwalm, "UV Coatings Basics, Recent Developments and New Applications", Elsevier Science, Dec 21, 2006, 316 pages.

Notification of Transmittal of the International Search Report and The Written Opinion of the International Searching Authority, or the Declaration of International (PCT) Application No. PCT/US2017/032430 mailed Jul. 31, 2017, 11 pages.

* cited by examiner

600

SYSTEM AND METHOD FOR USING A VOC FREE LOW RADIANT FLUX LED UV CURABLE COMPOSITION

The present application is a continuation of U.S. patent application Ser. No. 18/238,608, filed on Aug. 28, 2023, which is a continuation of U.S. patent application Ser. No. 16/425,400, filed on May 29, 2019, which is a continuation of U.S. patent application Ser. No. 15/593,985, filed May 12, 2017, which claims the benefits of and priority, under 35 U.S.C. § 119 (e) to U.S. Provisional Patent Application No. 62/335,823 filed May 13, 2016, the present application further claims the benefits of and priority, under 35 U.S.C. § 119 (e), to U.S. Provisional Application Ser. No. 62/382,968 filed Sep. 2, 2016, the present application further claims the benefits of and priority, under 35 U.S.C. § 119 (e), to U.S. Provisional Application Ser. No. 62/413,199 filed Oct. 26, 2016, the present application further claims the benefits of and priority, under 35 U.S.C. § 119 (e), to U.S. Provisional Application Ser. No. 62/430,125 filed Dec. 5, 2016, and also claims the benefits of and priority, under 35 U.S.C. § 119 (e), to U.S. Provisional Patent Application No. 62/452,093 filed Jan. 30, 2017, each of the above-identified applications are hereby fully incorporated herein by reference.

FIELD OF THE INVENTION

The present invention generally relates to a system and method for using a volatile organic compound (VOC) free low radiant flux LED UV curable composition, and more particularly to unique and novel uses of the composition such as one or two or more of the following a fire retardant, clear coat, composite material, resin, top coat, improved holdout coating, a sealant coat, and combinations of the same.

DISCUSSION OF THE BACKGROUND

Radiation curable compositions are beginning to gain industry acceptance. In order to cure radiation curable coatings high radiant fluxes are required on the order of 5 $W/cm^2$ or higher at the surface. These high radiant fluxes are typically generated with high flux energy sources including electron beam energy sources, mercury vapor light energy sources, which emit radiation in radiation including ultraviolet A (UVA) radiation (315 nm to 400 nm), ultraviolet B (UVB) radiation (280 nm to 315 nm), ultraviolet C (UVC) radiation (100 nm to 280 nm), and infrared (IR) radiation (700 nm to 1000 nm). Moreover, these high radiant flux energy sources are dangerous and require UV shielding to protect the operator and passerby's from UV light. Finally, the high radiant flux energy sources cannot be used with temperature sensitive substrates, e.g., substrates that are sensitive to high temperatures.

Besides the high radiant fluxes required to cure conventional radiation curable compositions. The conventional radiation curable compositions cannot cure to be tack free and are tacky after radiation curable due to oxygen inhibition. In practice, this requires using a nitrogen blanket in order to properly cure these UV compositions.

A need exists for a system and method for using VOC free low radiant flux LED UV curable composition.

SUMMARY OF THE INVENTION

Accordingly, the invention is directed to a system and method for using VOC free low radiant flux LED UV curable composition.

An advantage of the invention is to provide a coated substrate material with low radiant flux LED UV curable composition.

Another advantage of the invention is to provide a method of using a low radiant flux LED UV curable composition.

Another advantage of the invention is to provide a method of using a low radiant flux LED UV curable composition that cures in an oxygen environment at sixty seconds to tack free coating.

Still yet another advantage of the invention is to provide low radiant flux LED UV curable composition that has more than one use in a single coating.

Still yet another advantage of the invention is to provide low radiant flux LED UV curable composition that is a clear coat and fire retardant.

Still yet another advantage of the invention is to provide low radiant flux LED UV curable composition that is a clear coat and improves holdout.

Still yet another advantage of the invention is one or more of faster production speeds and capacity, reduction of work-in-process, dramatically reduced set-up/clean-up labor compared to related art, environmentally friendly, energy savings, no emissions controls, less floor space needed and increase yield and reduce scrap.

Still yet another advantage of the invention is to provide a coated substrate or article where the coated article includes a cured coating that has one or more of the following attributes: it is a chemically resistant coating, a sealant coating, a non-permeable coating, a fire retardant coating, an improved holdout coating, a tack free coating, and a pigmented coating.

One embodiment is directed towards a method of using volatile organic compound (VOC) free low radiant flux UV curable composition as a fire retardant coating to improve a fire retardant nature of a substrate. The method includes applying the VOC free low radiant flux UV curable composition on the substrate to form a fire retardant coating and applying an energy source having a wavelength in a range from about 360 nm to about 420 nm and a radiant flux at the surface of the coating of about 100 $mW/cm^2$ or less to cure the fire retardant coating within about 120 seconds or less.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, and alone or in combination, one or more of the features set forth above or described in detail below.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

Figure 1A:
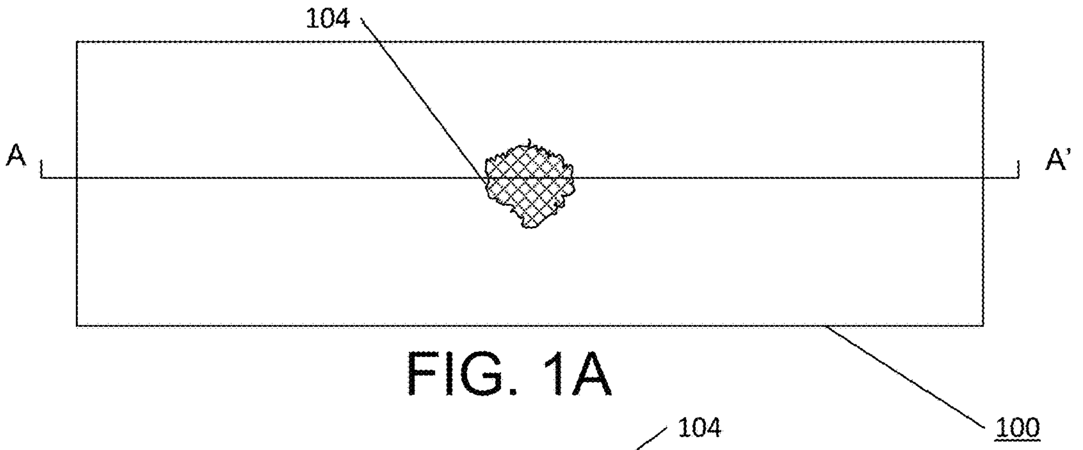
FIG. 1A illustrates a top view of a damaged article according to an embodiment of the invention.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE ILLUSTRATED EMBODIMENTS

The disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Embodiments herein presented are not exhaustive, and further embodiments may be now known or later derived by one skilled in the art.

Embodiments of the invention are directed towards using a VOC free low radiant flux UV curable material. In one embodiment the VOC free low radiant flux UV curable material includes an acrylate monomers/oligomers, a thiol monomers/oligomers, a photo initiators and a radical inhibitor. Optional additional components may include glass/silica fillers and pigments. Optionally, a thermal initiator can also be added to promote the curing of the material. Thermal initiators are known in the art.

The VOC free low radiant flux UV curable material can be cured into a tack free coating cured with UV or visible light irradiation from relatively low intensity light sources within sixty seconds or less and in wavelength in range from about 355 nm to about 420 nm. The material can be cured without UVB radiation and UVC radiation. In a preferred embodiment, the wavelength is from 385 nm to 405 nm and a more preferred embodiment the wavelength is about 390 nm. Low radiant flux means an energy measured at the surface of the material to be cured of less than about 500 $mW/cm^2$.

In a preferred embodiment, the low radiant flux means the energy from the energy source at the surface of the material to be cured is less than 400 $mW/cm^2$, in a more preferred embodiment, the energy at the surface of the material to be cured is less than 300 $mW/cm^2$, in a more preferred embodiment, the energy at the surface of the material to be cured is less than 200 $mW/cm^2$, in a more preferred embodiment the energy at the surface of the material to be cured is less than 100 $mW/cm^2$, and in a most preferred embodiment, the energy at the surface of the material to be cured is less than 40 $mW/cm^2$. In another embodiment, the low radiant flux is the energy at the surface of the material to be cured is 20 $mW/cm^2$, 19 $mW/cm^2$, 18 $mW/cm^2$, 17 $mW/cm^2$, 16 $mW/cm^2$, 15 $mW/cm^2$, 14 $mW/cm^2$, 13 $mW/cm^2$, 12 $mW/cm^2$, 11 $mW/cm^2$, 10 $mW/cm^2$, 9 $mW/cm^2$, 8 $mW/cm^2$, 7 $mW/cm^2$, 6 $mW/cm^2$, 5 $mW/cm^2$, 4 $mW/cm^2$, 3 $mW/cm^2$, 2 $mW/cm^2$, or 1 $mW/cm^2$.

In one embodiment, the energy source can be adjusted or controlled such that low radiant flux at the surface of the material to be cured is variable, e.g., linearly ramped from high to low or vice versa, non-linearly ramped or a combination of linearly ramping and non-linear ramping from about 0 $mW/cm^2$ to about 400 $mW/cm^2$ over a specified time or greater. Optionally and/or alternatively, the radiant flux may be intermittent by pulsing the energy source such that the energy at surface is on and off for predetermined time intervals. The predetermine time internals may be from 1 nanosecond to 5 seconds or more. This is can aid the curing of VOC free low radiant flux UV curable material as the curing process is a photochemical exothermic process. When using a temperature sensitive substrate one may want to minimize the temperature on the substrate caused by the exothermic curing and in such case predetermined wait time internals and applied time internals of the radiation can be configured to minimize temperature caused by the exothermic curing.

In one embodiment, the VOC free low radiant flux UV curable material has zero VOCs. The material cures rapidly to form a glassy high modulus optically clear material for example, the material may cure in two minutes or less. In a preferred embodiment, the material cures in one-hundred twenty seconds or less. The cured material is excellent for use in protective coatings, optical and outdoor applications and is non-yellowing when cured and has low oxygen inhibition. In one embodiment, the VOC free low radiant flux UV curable material is available from CPS 1020, CPS 1027, CPS 1030, and CPS 1040 from Colorado Photopolmyer Solutions out of Boulder Colorado, BlueSky Armor™ 1007 Clear Top Coat, BlueSky Armor™ 1027 Clear Top Coat, BlueSky Armor™ 1047 Clear Knife Grade Filler, BlueSky Armor™ 1057 Laminating Resin from MSI Coatings, Inc. out of Boulder, Colorado. In one embodiment, the VOC free low radiant flux UV curable material is solvent free (100% solids).

Optionally and/or alternatively, the VOC free low radiant flux UV material described herein in various embodiments can be any sheen including but not limited to a gloss sheen, a semi-gloss sheen, a satin sheen, a flat sheen, and an egg shell sheen.

The acrylate monomer may include monomers as known in the art, e.g., one or more of ethylene glycoldi(meth)acrylate, tetraethyleneglycol-di(meth)acrylate, poly(ethylene glycol) dimethacrylates, the condensation product of bisphenol A and glycidyl methacrylate, 2,2'-bis 4-(3-methacryloxy-2-hydroxypropoxy)-phenyl]propane, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate trimethylolpropane triacrylate, tris(2-hydroxy ethyl) isocyanurate triacrylate, tricyclodecane dimethanol diacrylate, and combinations thereof.

The thiol monomer/oligomers may include thiol monomer/oligomers as known in the art, e.g., one or more of, ethylene glycol bis(thioglycolate), ethylene glycol bis(3-mercaptopropionate), pentaerythritol tetra(3-mercaptopropionate), trimethylolpropane tris(3-mercaptopropionate), pentaerythritol tetra(2-mercaptoacetate), trimethylolpropane tris (2-mercaptoacetate), 1,6-hexanedithiol, 1,2-benzenedithiol, 1,3-benzenedithiol, isophorone diurethane thiol, and combinations thereof.

The photo initiators may include photo initiators as known in the art that are capable of generating free radicals when exposed to visible light and/or UVA radiation. A preferred class of photo initiator is bisacyl phosphine oxides. In addition, the photo initiator may include one or more of 2,2-dimethoxy-1,2-diphenylethan-1-one, bis(2,4,6-trimethylbenzoyl)-phenylphosphineoxide, 1-hydroxy-cyclohexyl-phenyl-ketone (Irgacure 184), 1-hydroxycyclohexyl benzophenone, trimethyl-benzoyl-diphenyl-phosphine-oxide, and combinations thereof.

The radical inhibitors may include radical inhibitors as known in the art, e.g., one or more of N-nitrosophenylhydroxylamine, hydroquinone and derivatives, monomethyl ether hydroquinone, benzoquinone, methoxy hydroquinone, tert butyl catechol, phenothiazine, or pyrogallol. In one aspect, the inhibitors prevent the acrylate monomer photopolymerization from occurring before being activated by light.

The glass/silica fillers may include glass/silica fillers as known in the art, e.g., one or more of a silica particle, Kevlar veil, PET mesh, fiber mesh, metal mesh, Multi-Walled Carbon NanoTube (MWCNTs), Carbon NanoTube (CNTs), fumed silica particle, organoclay, clays, alumina, titania, zirconia, carbon, bioglass (or bioactive glass), hydroxyapatite (HA) particle/mesh, quartz, barium glass, barium salt, and titanium dioxide.

Optionally and/or alternatively, additional additives may be included including anti-skid powder configured to prevent slipping on the surface, e.g., a roughened surface. The anti-skid coatings may include additives for anti-slip purposes, e.g., silica, polyester powders, sand, organic or synthetic rigid particles, and combinations of the same.

The pigments may include pigments as known in the art, e.g., titanium dioxide, zinc phosphate, zinc sulfide, zinc oxide, barium sulfate, magnesium silicate and corrosion inhibiting pigments, e.g., strontium chromate, zinc phosphate and barium metaborate, can be included. Optionally and/or alternatively, the pigment may be added to the desired color, e.g., up to 5% by volume to create a transparent tone to a solid colored coating. Several coatings may be necessary for adequate coverage and desired thickness.

In one embodiment, the pigments can include any combination of pigments to achieve any color, e.g., UVDJ070 Spectraray IJ as a white pigment, UVDJ107 Spectraray IJ as a black pigment, UVDJ554 Spectraray IJ as a cyan pigment, UVDJ32 Spectraray IJ as a red and/or magenta pigment, and/or a UVDJ350 Spectraray IJ as a yellow pigment.

In one embodiment the VOC free low radiant flux UV curable material may have a viscosity [cps] at 25 C in a range from about 20 [cps] to about 1,000,000 [cps] or more, and in a preferred embodiment the viscosity 30 [cps] to 300 [cps] or more.

The VOC free low radiant flux UV curable composition may be in any form including for example, pre-impregnated composite fiber, pre-impregnated sheets or rolls, sprayable, paintable, laminating, paste, rollable, and moldable varieties of viscosity.

One embodiment of the invention is directed towards a method of using the VOC free low radiant flux UV curable material according to methods described herein as decorative and/or protective coating on interior and exterior surfaces of: aircraft, automotive, recreational vehicles, watercraft, furniture and cabinetry, hardwood flooring, such as solid and engineered laminates, fishing tackle such as coating lures and baits, fiber reinforced fishing rods, fiber reinforced water sports equipment such as but not limited to: surfboards, wakeboards, bodyboards, water skis, skim boards, paddle boats, etc., fiber reinforced bathware, spas, and hot tubs, fiber reinforced body panels for automotive, recreational vehicles, and watercraft. As a laminating resin, filling agent or coating for the manufacture and repair of: fishing tackle such as coating lures, baits, fiber reinforced fishing rods, fiber reinforced water sports equipment such as but not limited to: surfboards, wakeboards, bodyboards, water skis, skim boards, paddle boats, etc., fiber reinforced bathware, spas, pools, hot tubs, fiber reinforced body panels for automotive, recreational vehicles, watercraft, vehicle paneling such as those for recreational vehicle compartment walls, acoustic panels, aircraft interior cabinetry, fiber reinforced construction applications such as retention barriers for window wells, replications of construction facades such as decorative rock for building fronts, millwork, or ornamentations, structural chips, cracks, breaks, punctures or voids in composite matrix products, fiberglass, acrylic, glass, ceramic, porcelain, tile, natural, manmade stone, concrete, any solid material to add substance where material is lacking creating a new surface to provide for continuity, restoration, repair, etc. that is sandable, paintable, and can be tooled and conformed.

One embodiment of the invention includes using the VOC free low radiant flux UV curable material as general purpose bonding material for two or more materials such as securing the windings over the guide to the rod on a fishing rod, securing windings on a fishing fly, securing electrical windings on motors, or any other process where the materials to be bonded are both covered and irradiated. As an anti-tampering coating useful for indicating a break in safety protocols requiring the physical security of an object within a storage container or device.

One embodiment of the invention includes using the VOC free low radiant flux UV curable material to form or improve at least one or more of a tack free coating, low tack free cure time, rapid cure time, fire retardant coating, clear coating, volatile organic compound (VOC) free coating, improved holdout composition, and combinations of the same.

One embodiment is directed towards a method of coating a substrate with the VOC free low radiant flux UV curable material to form a glassy high modulus, with non-yellowing and low oxygen inhibition coating.

One embodiment of the invention is directed towards a dual purpose coating including a top coat and fire retardant in one coating.

One embodiment is directed towards a method of using the VOC free low radiant flux UV curable material as a coating for more than one purpose including two or more of: a top coat, a fire retardant coating, a sealant coating, e.g., cement sealer, wood sealer, a stain coating, an improved holdout coating and combinations of the same.

One embodiment of the invention is directed towards cured coating with a pencil hardness H in range from about 1H to about 6H or greater.

One embodiment of the invention is directed towards curing the VOC free low radiant flux UV curable material to a cure depth in a range from less than 1 mm to about 40 mm or less, in a preferred embodiment the cure depth is less than 1 mm. One embodiment of the invention is directed towards filing cracks in concrete or similar material and curing the material.

Holdout means the ability of a coating to remain at or near the surface of a substrate, as opposed to penetrating that substrate. Better holdout results in the appearance of a smoother, more uniform coated surface with increased gloss and depth as compared to a coated substrate with less holdout. This is true even though the same dry film thickness of coating may have been applied to both substrates. For instance, in a porous substrate, when a coating is applied, the coating may absorb or permeate into the substrate. One embodiment of the invention is directed towards a method that reduces the amount of the coating absorbed into the substrate, allowing more of the coating to remain at or near the surface of the substrate. By increasing holdout in this manner, the resulting substrate has a smoother overall surface, and the substrate requires a fewer number of coatings. By reducing the number of required coatings, the invention also provides the advantages of reducing labor and material costs, while maintaining a coating with desirable properties. Moreover, increased or improved holdout means decreased fiber raising and increased moisture resistance. It is believed, the substrate will require a fewer number of coatings to achieve a desired finish. It is also believed the invention will lead to reduced processing time and reduced labor and material costs. Moreover, it is believed the invention provides a way to size a three-dimensional substrate. It is further believed the substrate produced by the process of the invention will typically display an increased stiffness, strength, smoothness and/or weight. It is further believed the invention can produce a sized or pretreated board that is compatible with a variety of overcoats. In one embodiment, the invention is directed towards man-made fiber boards, such as low density, medium density and high density fiber boards, for example.

Fire retardant or fire resistance means a coating with the ability to withstand fire. One quantification is the ability of the coating to pass a twelve second or sixty second vertical flammability test as set forth in 37 C.F.R. Part 25.853 (a) Amdt 25-116 Appendix F Part I (a)(1)(ii), which is hereby incorporated by reference. As shown Example 1—Table 1 or Example 2—Table 2, therefore, having a dual purpose coating was a clear coat and fire retardant.

One embodiment of the invention is directed towards using the VOC free low radiant flux UV curable material as a fire retardant, sealant and a top coat finish in one coating. Therefore, having a triple purpose in a single coating.

Tack free is the ability of a coating to not be sticky on the surface as opposed to coating that it is sticky on a surface. Tack free time is equal to or less than the curing time and means the applied coating is no longer sticky to the touch.

VOC free means a coating or coating composition that excludes organic chemicals, contains no organic chemicals, or has zero organic chemicals that have a high vapor pressure at ordinary room temperature. A high vapor pressure is a vapor pressure that results from a low boiling point, which causes large numbers of molecules to evaporate or sublimate from the liquid or solid form of the compound and enter the surrounding air, a trait known as volatility. For example, formaldehyde, which evaporates from paint, has a boiling point of only −19° C. (−2° F.).

One embodiment of the invention is directed towards using the VOC free low radiant flux UV curable material on a broad variety of substrates, made from various materials, such as wood, wood laminates, fiber glass, plastic, metal and combinations of the same. Examples of typical substrates may be selected from the group including, but not limited to, substrates such as high density fiber board, medium density fiber board, low density fiber board, cardboard, chipboard, particle board, mini-blinds, Masonite, cement fiber board and mindy board.

In a preferred embodiment, the energy source can be a light emitting diode (LED), fluorescent tube or other conventional bulb having a wavelength in the range from about 360 nm to about 420 nm, in a preferred embodiment about 390 nm. In one embodiment, a LED Blacklight Ultraviolet bar powered by 9×3-Watt UV long life LED's (approx. 50,000 hrs.) and a low power draw of only 30-Watts, the Eco UV Bar 50 IR is an affordable, low maintenance solution for producing brilliant washes of ultraviolet light that can be used. The energy source can be a handheld flashlight designed for LED bulbs below 420 nm, LED bar lights commonly found in the entertainment industry emitting below 420 nm, fluorescent tube lighting commonly available in the UV curing industry and/or exposure to ambient sunlight.

One embodiment is directed towards a method of resurfacing or coating a material or substrate. The material or substrate may be a preexisting material including one or more of cement, wood, plater, plastic, fiberglass, thermoplastics, and combinations of the same. For example, the material may be worn or used swimming pool surface including at least one or more of chips, cracks, mold, algae, and combinations of the same. The resurfacing method includes cleaning and drying the cement surface. The method includes applying a VOC free low radiant flux UV material to the material or substrate by any conventional technique, e.g., spray, paint brush, roller, combinations of the same or the like, to a predetermined thickness. In a preferred embodiment, the thickness of the wet coating is in a range from about 2 mils to about 5 mils. Next, an energy source having wavelength in a range from about 360 nm to about 420 nm at a surface power density less than about 400 mW/cm$^2$ was applied to cure the material for about two minutes or less. Of course, other curing surface power densities, curing times and/or additives may also be utilized as described herein. These steps are repeated until the desired thickness is achieved.

Optionally, and/or alternatively, the energy source may be dynamically adjusted as described herein, e.g., be pulsed, ramped non-linearly, ramped linearly or combination as described herein.

One embodiment of the invention is directed towards filling cracks in a substrate, e.g., a cement substrate. The cracks can be prefilled with a packing material, e.g., fiberglass rope that is coated or uncoated to prefill the crack. The packing material may include any composite material as described herein. If the packing material coated and/or saturated with the VOC free low radiant flux UV curable material it is cured. The curing includes applying an energy source for about 2 minutes or less having wavelength in a range from about 360 nm to about 420 nm at a surface power density less than about 400 mW/cm$^2$ was applied to cure the material for about two minutes or less. Of course, other curing surface power densities, curing times and/or additives may also be utilized as described herein. Next the crack is filled or partially with the VOC free low radiant flux UV curable material it is cured as described herein. This filling process and curing may be repeated. The finally surface can be leveled with a mechanical grinding means if required.

One embodiment is directed towards a method of forming a chemically resistant non-permeable protective layer or coating. The chemically resistant coating may be resistant to acid of less than 0 pH, 1 pH, 2 pH, 3 pH, 4 pH, 5 pH and higher. In addition, it is believed the coating is also resistant to a higher alkalinity, e.g., 6 pH to about 14 pH. Therefore, the coating will withstand harsh and destructive elements, e.g., sea water, steam, non-diluted muriatic acid, and the like. The protective coating may be formed on the desired substrate or material by applying a VOC free low radiant flux UV material to the material or substrate by any conventional technique, e.g., dipping, encapsulation, spray, paint brush, roller, combinations of the same or the like, to predetermined thickness. In a preferred embodiment, the thickness of the wet coating is in a range from about 2 mils to about 5 mils. Next, a radiation energy source having wavelength in a range from about 360 nm to about 420 nm at a surface power density less than about 40 mW/cm$^2$ was applied to cure the material for about two minutes or less. Of course, other curing surface power densities, curing times and/or additives may also be utilized as described herein. These steps are repeated until the desired thickness is achieved. Optionally and/or alternatively, the energy source may be pulsed, ramped non-linearly, ramped linearly or combination as described herein.

One embodiment is directed towards a method of manufacturing a premanufactured panel for an aerospace vehicle or application, e.g., decorative cabinets, walls, prefabricated panels and other materials. In this embodiment, a wood veneer is adhered to an aerospace substrate, e.g., honeycomb made of alloy, composite or combination of the same. The wood veneer may have one or more surfaces treated with a fire retardant. In one embodiment the veneer is not treated with a fire retardant as the VOC free low radiant flux UV material is a fire retardant as discussed herein. The adhesive may include adhesives as known in the art, e.g., 3M Hi-Strength 90 contact adhesive.

Optionally and/or alternatively, the veneer does not include a stain, but is a natural wood veneer, e.g., bird's eye maple. The method includes applying the VOC free low radiant flux UV material with a pigment, e.g., stain as a liquid or powder, to the desired tone, to one or more surfaces of the veneer. Optionally, the veneer may be entirely encapsulated with the VOC free low radiant flux UV material. The stain colors or darkens the appearance of the veneer. Next, an ultraviolent energy source in a range from about 360 nm to about 420 nm is applied to the coating at a surface power density in range from about 3 mW/cm$^2$ to about 400 mW/cm$^2$ to cure the applied material and in preferred embodiment is 40 mW/cm$^2$ or less. Additional layers and curing is done until a desired thickness is reached. Pigments can also create a translucent stain or toner and to create a specific finish appearance and pattern on stain-grade wood and solid colored substrates. The coating serves at least four simultaneous purposes including a stain, a fire-retardant, optionally an insulator, and a protective or a sealing coating in one process step, thereby, reducing processing steps and overall cost of forming the aircraft panel. The coating may be configured to any sheen gloss, semi-gloss, satin, flat, and egg shell. Optionally, the material in the initial coating, i.e., directly adjacent to the veneer, may be allowed to penetrate the veneer using a dwell time of 30 seconds to about 60 minutes or more in an uncured state prior to curing with energy source. This dwell time allows the material to penetrate into the veneer by absorbing into the body of the veneer, e.g., pores, cracks, micro-cracks. Optionally and/or alternatively, heat can be applied to the material during the dwell time step or before the coating step with a heat source, e.g., heat gun or other conventional heating source. The heat allows moisture or VOC material in the veneer to be released.

One embodiment is directed towards a method of manufacturing hybrid frame fabricated by initially forming a stack of fibrous layers or other composite material described herein in an annular pattern with a VOC free low radiant flux UV material cured through a transparent mold with ultraviolent energy source in a range from about 360 nm to about 420 nm at a surface power density in range from about 3 mW/cm$^2$ to about 40 mW/cm$^2$ to cure. Other energies as described herein may be utilized.

One embodiment is directed towards forming an annular aircraft window frame including forming a stack of fibrous layer or composite material (described herein) impregnated or soaked with a VOC free low radiant flux UV material as described herein in an annular pattern. Forming an annular metal trim conforming with said annular pattern, trapping said trim in a lower transparent mold having a lower mold channel, trapping said stacked layers atop said trim in said lower transparent mold channel, and pressing an upper mold atop said stacked layers for compression applying the ultraviolent energy source in a range from about 360 nm to about 420 nm at a surface power density as described herein. Other energies as described herein may be utilized.

Optionally, and/or alternatively, the molds used in one or more embodiments may include a transparent mold with or without transparent vacuum bags for forming composites. The molds may include an integrated energy, e.g., embedded light emitting diodes, or any external energy source.

One embodiment is directed towards manufacturing a bathware by replacing the porcelain over steel bathware or glazed bathware with the VOC free low radiant flux UV material as described herein. The material is cured as described herein. As discussed herein several layers may be built up and cured. Optionally and/or alternatively, the bathware may be created with a mold injection bathware using the VOC free low radiant flux UV material. The pigments and additional decorative components may be used.

One embodiment is directed towards bonding of two or more materials, e.g., securing the windings over the guide to the rod on a fishing rod, securing windings on a fishing fly, securing electrical windings on motors, or any other process where the materials are desired to be bonded. In this embodiment, the materials to be bonded are coated or covered with the VOC free low radiant flux UV material. Next, radiation from an energy source having wavelength in a range from about 360 nm to about 420 nm at a surface power density less than about 40 $mW/cm^2$ is applied to cure the material for about two minutes or less. Of course, other curing surface power densities, curing times and/or additives may also be utilized as described herein. These steps are repeated until can be repeated until the desired thickness is achieved. In a preferred embodiment, surface preparation is done to ensure the surfaces of the materials to be bonded are clean (free of waxes, greases, oils or other contaminants) and dried. The applied material is done with a sufficient quantity to cover the materials to be bonded, however, when bonding delicate materials, only small amounts of the VOC free low radiant flux UV material is required to secure them together until either a thicker layer or multiple layers are applied in a buildup process.

One embodiment is directed towards an insulator coating for electrical applications. The VOC free low radiant flux UV material can be used to cover wires, e.g., bare wires, or other electrical components to any thickness as described herein by applying the material to a desired thickness, curing the material and repeating. The cured material is an electrical insulator.

One embodiment is directed towards an anti-tampering coating or junction. This method may be useful for indicating a break in safety protocols requiring the physical security of an object within a storage container or device. The VOC free low radiant flux UV material is used to cover or create anti-tampering junction to any thickness as described herein by applying the material to a desired thickness, curing the material and repeating. The cured material is now an anti-tampering junction, so one would know if the junction is open or broken. Of course, pigments and other additives may be included as described herein.

Reference will now be made in detail to embodiments of the invention, example of which is illustrated in the accompanying text.

Figure 1B:
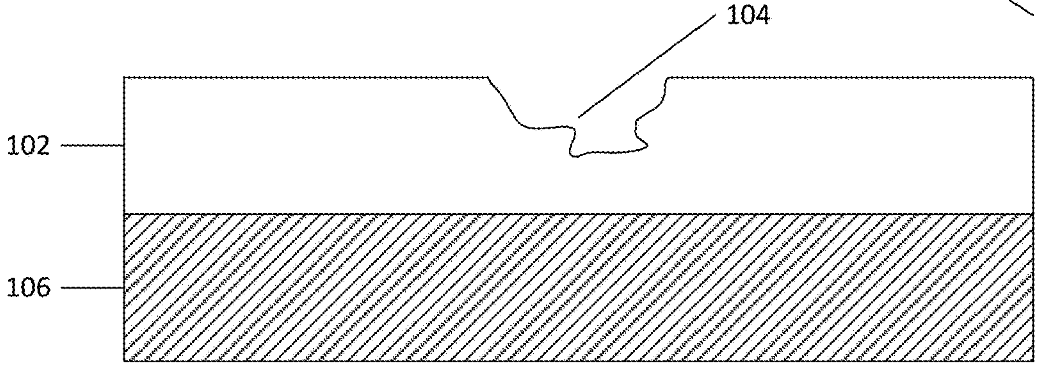
FIG. 1B illustrates a cross sectional view along line A to A' of the damaged article of FIG. 1A.
Figure 1C:
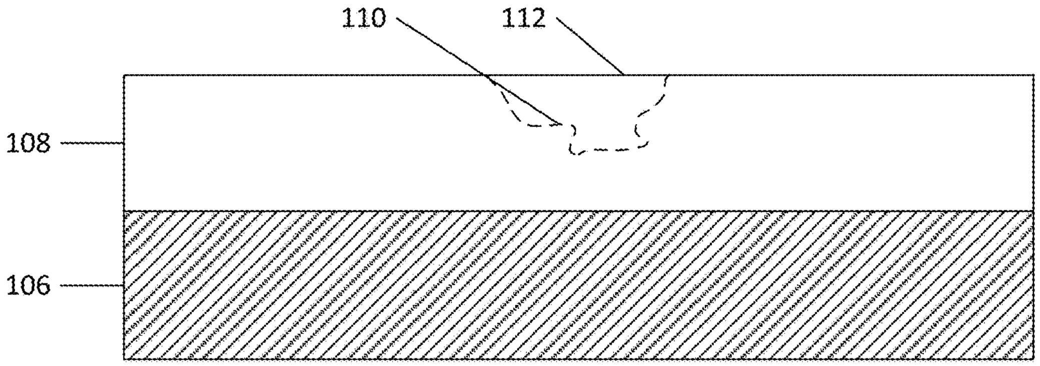
FIG. 1C illustrates a cross sectional view along line A to A' of the repaired article of FIG. 1A.
Figure 1D:
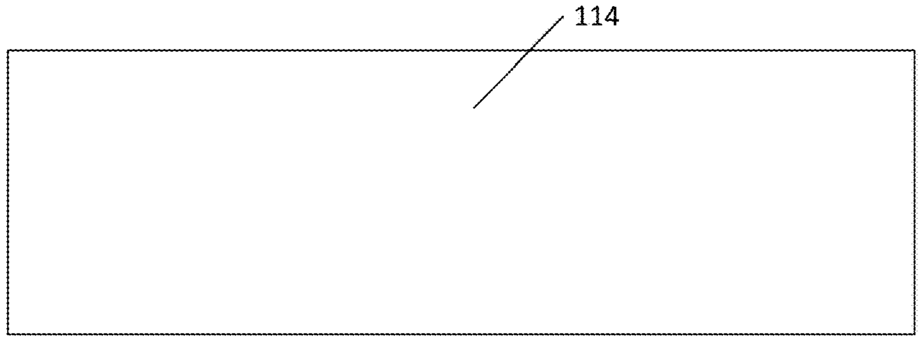
FIG. 1D illustrates a top down view of the repaired article.

FIG. 1A illustrates a top view of a damaged article according to an embodiment of the invention. FIG. 1B illustrates a cross sectional view along line A to A' of the damaged article of FIG. 1A. FIG. 1C illustrates a cross sectional view along line A to A' of the repaired article of FIG. 1A. FIG. 1D illustrates a top down view of the repaired article.

Referring to FIGS. 1A-1D, the repair of an article 100 is generally described. In FIG. 1A, the article 100 includes a VOC free low radiant flux UV cured material. In this embodiment, the VOC free low radiant flux UV cured material is described herein has damage 104 or a damaged region 104. The VOC free low radiant flux UV cured material 102 is a preexisting coating on a substrate 106. The substrate 106 may include any type of substrate, e.g., decorative material, cement, fiberglass, composite material, wood, veneer, metal, alloy, man-made fiber board, high density fiber board, medium density fiber board, low density fiber board, cardboard, chipboard, particle board, Masonite, cement fiber board, Mindy board and combinations of the same. Optionally, and/or alternatively, the substrate may include a honeycomb substrate made from alloy, aluminum alloy, composite, fiberglass, carbon fiber, thermoplastic, wood, metal and combinations of the same. Optionally, and/or alternatively, the substrate may include a honeycomb substrate made from alloy, aluminum alloy, composite, fiberglass, carbon fiber, thermoplastic, wood, metal and combinations of the same with a wood veneer material adhered to the substrate.

In this embodiment, the cured coating was already present and formed by applying a radiation energy source in a range from about 360 nm to about 420 nm at a surface power density less than about 40 $mW/cm^2$ to the VOC free low radiant flux UV cured material. In a preferred embodiment, the VOC free low radiant flux UV cured material includes an acrylate monomers/oligomers, a thiol monomers/oligomers, a photo initiator, and a radical inhibitor. Of course, other curing energies, surface power densities, and/or additives may also be utilized as described herein.

The cured coating 102 includes a cross-linked matrix and does not have definitive visible layers or a series of layers as would be present in a conventional urethane, VOC laden coating or non-radiation cured coating. The damaged region 104 is a three-dimensional damaged region and has a dimension into the bulk surface of the coating 102, but does not impinge into the substrate 106. That is, the substrate 106 is not damaged in this embodiment only the cured coating 102 is damaged in region 104.

Figure 4:
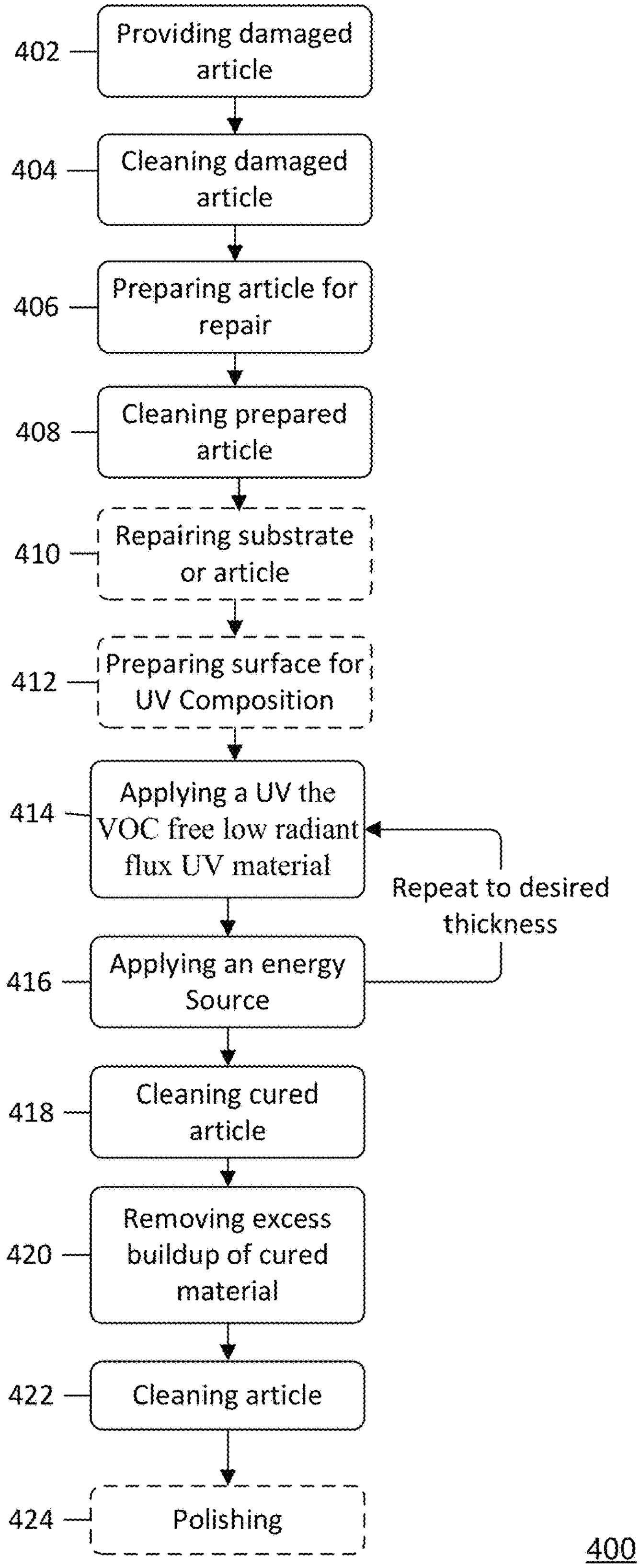
FIG. 4 illustrates a method of repair according to an embodiment of the invention.

Referring now to FIG. 4, the damaged article 100 is repaired with reference to method of repair 400. In this embodiment, the damaged article 100 is provided having a damaged region 104 (step 402). In step 404, the damaged article 100 is cleaned with water, IPA, acetone or combinations of the same. Preferably, the surface 102 of the damaged article 100 is cleaned with an isopropyl alcohol (IPA). Referring to FIG. 1B, the cleaned surface is prepared further (in Step 406) by removing any rough surfaces, jagged edges and/or other damage to the damaged article. In this embodiment in step 406 this may be done by mechanically removing, e.g., sanding, with an abrasive material, razor blade, knife, heat source and/or other techniques. Following step 406, the article is further cleaned like in step 404, e.g., with IPA. In this embodiment, the substrate is not damaged, so step 410 is not required or performed.

In step 412, the surface is now prepared for receiving UV composition by roughening the surface of the coated article to promote adhesion. In a preferred embodiment this may be done with an abrasive material, e.g., sand paper. In a more preferred embodiment, the coating 102 is sanded with liquid grit abrasive to roughen the surface and provide a mechanical bond. This is also an optional step.

In step 414, a VOC free low radiant flux UV material is applied to the substrate by any conventional technique, e.g., spray, paint brush, dip, bath, roller, combinations of the same or the like, to a first thickness to fill the damaged region 112. In a preferred embodiment, the thickness of the wet coating is in a range from about 2 mils to about 5 mils or less and only partially fills the damaged coating. That is a conformal coating is applied. Next, in step 416 a radiation energy source having wavelength in a range from about 360 nm to about 420 nm at a surface power density less than about 40 mW/cm$^2$ was applied to cure the material for about two minutes or less. In a preferred embodiment, the VOC free low radiant flux UV cured material includes an acrylate monomers/oligomers, a thiol monomers/oligomers, a photo initiator, and a radical inhibitor. Of course, other curing surface power densities, curing times and/or additives may also be utilized as described herein. Steps 414 and 416 are repeated until the desired thickness is achieved. In a preferred embodiment, steps 414 and 416 are repeated until the added cured material has a thickness that is about 2 mils to about 4 mils or greater than the surface of the preexisting cured material 102. Optionally and/or alternatively, the energy source may be pulsed, ramped non-linearly, ramped linearly or combination as described herein.

Next in step 418 the article is cleaned with water, IPA and/or acetone. In step 420 any excess material (2 mils or greater) is removed, e.g., by an abrasive material. In a preferred embodiment, the surfaces 108 and 112 are planarized in step 420 by sanding and/or polishing with a series of abrasive materials, e.g., starting with a course abrasive and ending with a fine abrasive. In a preferred embodiment the dry sanding includes sanding with one or more of six different grits ranging from 600 grit to 2000 grit. In a more preferred embodiment, the dry sanding components include a 600 grit material, 800 grit material, 1000 grit material, 1200 grit material, 1500 grit material, and 2000 grit material. Next in step 422 the article is cleaned with a material such as water, IPA and/or acetone.

Optionally, the article with the repaired coating is polished (step 424) with a liquid polish to any desired shine. Referring now to FIG. 1C, there is no visible discountinuity 110 between the repaired coating 112 and the original coating 108. This is believed to be due to the cross-linked nature of the cured coating. By way of example, referring to FIG. 1D there is no visible, to a human eye, discountinuity between the repaired coating 112 and the original material 108. This is in direct contrast to the related art. One problem with the conventional coatings is that any repair would show to the human eye a stop and start line in pattern, e.g., bullseye pattern, which is believed to be caused by the solvents present in at least one or more of the original coating or repair coating.

It is believed the discontinuities are due to the solvents in the conventional material as they will show a margin line or discountinuity region or other imperfection between the original material and the repaired material. It is also believed that this is caused by an inability to polish solvents. In contrast, in embodiments of this invention there is believed to be no, or virtually no, discountinuity present between the original coating and the repaired coating as full polishing is possible as there is approximately one hundred percent solids in the cured repaired coating and the original coating as shown in FIG. 1C and FIG. 1D. This also means there would be no visible discontinuities to the human eye present between the repaired material and the original material when looking at the repaired material from a top down view, angle view, side view or any combination view (FIGS. 1C and 1D). As used herein the discontinuities can be characterized as a stop and start line, margin line, or other visible imperfection between the repaired region and the original region.

Figure 2A:
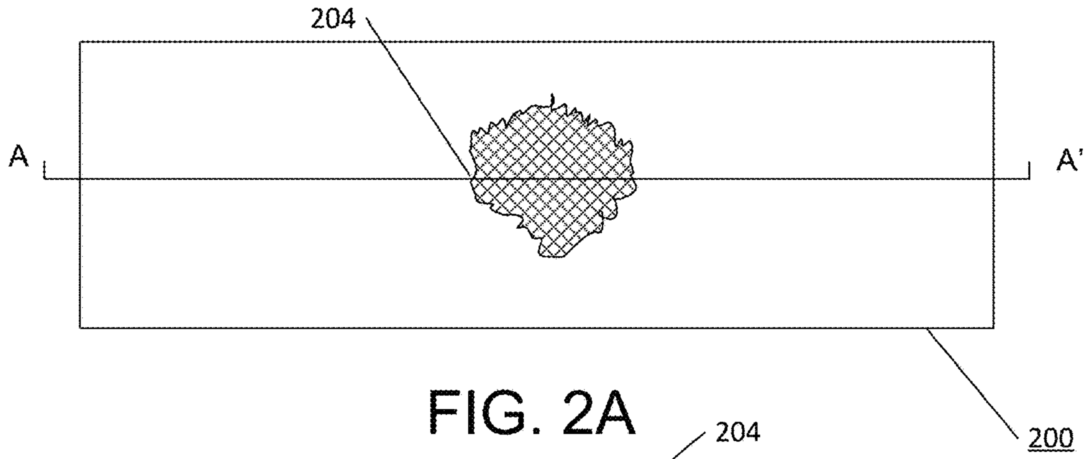
FIG. 2A illustrates a top view of a damaged article according to another embodiment of the invention.
Figure 2B:
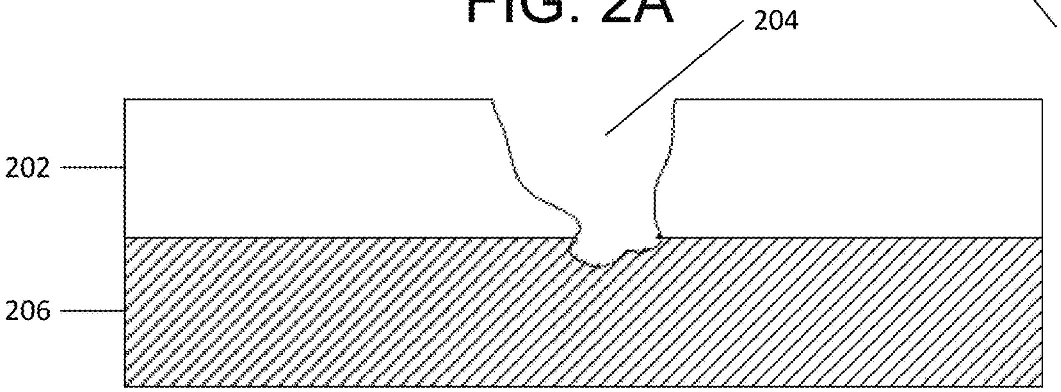
FIG. 2B illustrates a cross sectional view along line A to A' of the damaged article of FIG. 2A.
Figure 2C:
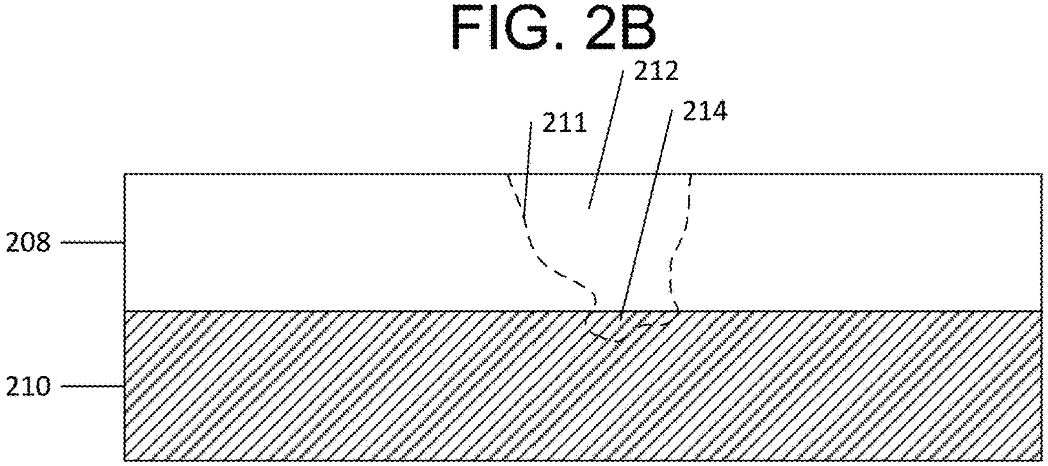
FIG. 2C illustrates a cross sectional view along line A to A' of the repaired article of FIG. 2A.
Figure 2D:
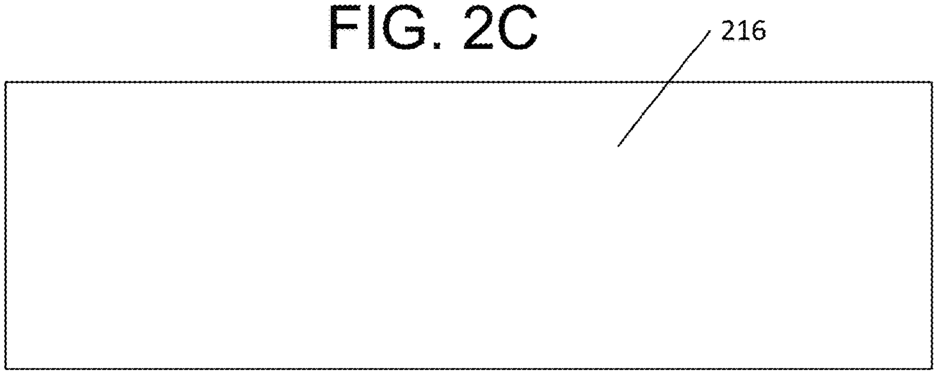
FIG. 2D illustrates a top down view of the repaired article.

FIG. 2A illustrates a top view of a damaged article according to another embodiment of the invention. FIG. 2B illustrates a cross sectional view along line A to A' of the damaged article of FIG. 2A. FIG. 2C illustrates a cross sectional view along line A to A' of the repaired article of FIG. 2A. FIG. 2D illustrates a top down view of the repaired article.

Referring to FIGS. 2A and 2B, the article 200 includes a cured VOC free low radiant flux UV coating 202 that has damage or a damaged region 204. The article 200 includes a cured coating 202 on a substrate 206. The substrate 206 may include any type of substrate, e.g., decorative material, cement, fiberglass, composite material, wood, veneer, metal, alloy, man-made fiber board, high density fiber board, medium density fiber board, low density fiber board, cardboard, chipboard, particle board, Masonite, cement fiber board, Mindy board and combinations of the same. Optionally and/or alternatively, the substrate may include a honeycomb substrate made from alloy, aluminum alloy, composite, fiberglass, carbon fiber, thermoplastic, wood, metal and combinations of the same with a wood veneer material adhered to the substrate.

In this embodiment, the cured coating was already present and formed by applying a radiation energy source in a range from about 360 nm to about 420 nm at a surface power density less than about 40 mW/cm$^2$ to the VOC free low radiant flux UV cured material. In a preferred embodiment, the VOC free low radiant flux UV cured material includes an acrylate monomers/oligomers, a thiol monomers/oligomers, a photo initiator, and a radical inhibitor. Of course, other curing energies, surface power densities, and/or additives may also be utilized as described herein.

The cured coating 202 includes a cross-linked matrix or substantially solid material of about one hundred present solids and does not have definitive visible layers or a series of layers as would be present in a conventional urethane, VOC laden coating or non-radiation cured coating.

In this embodiment the damage 204 is a three-dimensional damage and has a dimension into the bulk surface of the coating 202 and also damage on the substrate 206. That is, the substrate 206 has damage in this embodiment that needs to be repaired as well. In this embodiment, the substrate is a wood surface, e.g., a veneer wood surface.

Referring now to FIG. 4, the damaged article 200 is repaired with reference to 400. In this embodiment, the damaged article 200 is provided having a damaged region 204 (step 402). In step 404, the damaged article 200 is cleaned with IPA, water, and/or acetone. Preferably, the surface 202 of the damaged article 200 is cleaned with IPA. Referring to FIG. 2B, the cleaned surface is prepared further (in step 406) to remove any rough surfaces, jagged edges and/or other damage to the damaged article. In this embodiment in step 406 this may be done by a mechanical mechanism, e.g., sanding with an abrasive material, razor blade, knife, or done with a heat source and/or other techniques. Next, in step 408 the prepared article and/or surface is cleaned again as described with reference to step 404.

Next the substrate 206 is repaired in step 410. In this embodiment, a wood filler or putty is used to repair the damage with an added stain matching the original stain of the substrate 206. However, the repair may include other techniques as known in the art that are substrate dependent.

In step 412, the surface is now prepared for receiving the VOC free low radiant flux UV cured material by roughening the surface of the coated article to promote adhesion. In a preferred embodiment this may be done with an abrasive material, e.g., sand paper. This step is optional.

In step 414, a VOC free low radiant flux UV material is applied to the substrate by any conventional technique, e.g., spray, paint brush, dip, bath, roller, combinations of the same or the like, to a first thickness to fill the damaged region 204. In a preferred embodiment, the thickness of the wet coating is in a range from about 2 mils to about 5 mils or less and only partially fills the damaged coating. That is a conformal coating is applied. Next, in step 416 a radiation energy source having wavelength in a range from about 360 nm to about 420 nm at a surface power density less than about 40 mW/cm$^2$ was applied to cure the material for about two minutes or less. In a preferred embodiment, the VOC free low radiant flux UV cured material includes an acrylate monomers/oligomers, a thiol monomers/oligomers, a photo initiator, and a radical inhibitor. Of course, other curing surface power densities, curing times and/or additives may also be utilized as described herein. Steps 414 and 416 are repeated until the desired thickness is achieved. In a preferred embodiment, steps 414 and 416 are repeated until the added cured material has a thickness that is about 2 mils to about 4 mils or greater than the surface of the preexisting cured material 202. Optionally and/or alternatively, the energy source may be pulsed, ramped non-linearly, ramped linearly or combination as described herein.

Next in step 418 the article is cleaned with water, IPA and/or acetone. In step 420 any excess material (2 mils or greater) is removed, e.g., by an abrasive material. In a preferred embodiment, the surfaces 208 and 212 are planarized in step 420 by sanding and/or polishing with a series of abrasive materials, e.g., starting with a course abrasive and ending with a fine abrasive. In a preferred embodiment the dry sanding includes sanding with one or more of six different grits ranging from 600 grit to 2000 grit. In a more preferred embodiment, the dry sanding components include a 600 grit material, 800 grit material, 1000 grit material, 1200 grit material, 1500 grit material, and 2000 grit material. Next in step 422 the article is cleaned with a material such as water, IPA and/or acetone.

Optionally, the article with the repaired coating is polished (step 424) with a liquid polish to any desired shine. Referring now to FIG. 2C, there is no visible discountinuity 211 between the repaired coating 208 and the original coating 208. This is believed to be due to the cross-linked nature of the cured coating. By way of example, referring to FIG. 2D there is no visible to a human eye discountinuity between the repaired coating 212 and the original material 208. This is in direct contrast to the related art. One problem with the conventional coatings is that any repair would show to the human eye a stop and start line in pattern, e.g., bullseye pattern, which is believed to be caused by the solvents present in at least one or more of the original coating or repair coating.

It is believed the discontinuities are due to the solvents in the conventional material as they will show a margin line or discountinuity region or other imperfection between the original material and the repaired material. It is believed that this is due to one's inability to polish solvents. In contrast, in embodiments of this invention there is no, or virtually no, discountinuity present between the original coating and the repaired coating as full polishing is possible as there is approximately one hundred percent solids in the cured repaired coating and the original coating as shown in FIG. 2C and FIG. 2D. This also means there are no visible discontinuities to the human eye present between the repaired material and the original material when looking at the repaired material from a top down view, angle view, side view or any combination view (FIGS. 2C and 2D). As used herein the discontinuities can be characterized as a stop and start line, margin line, or other visible imperfection between the repaired region and the original region.

Figure 3A:
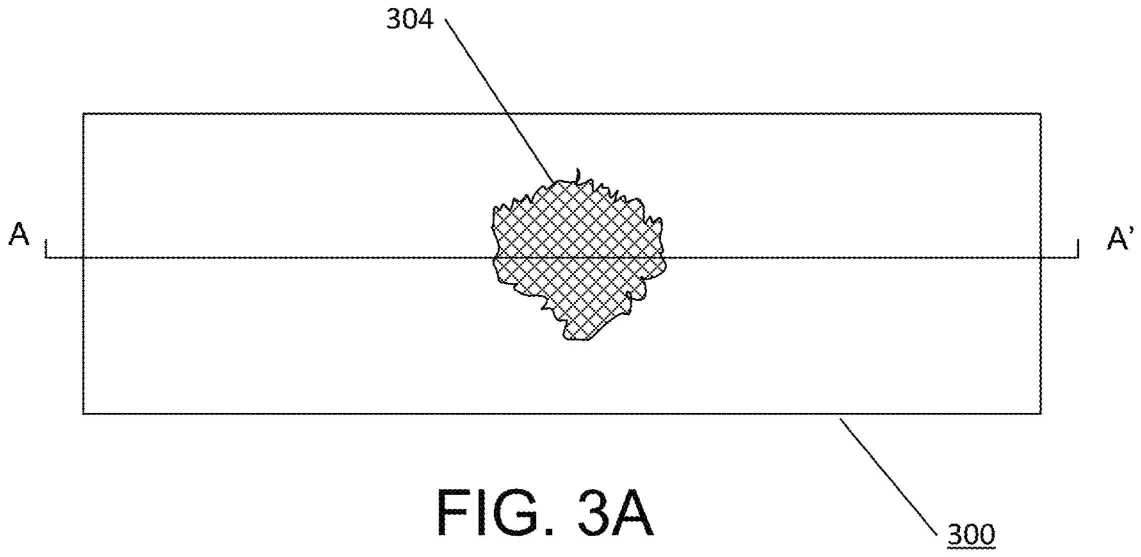
FIG. 3A illustrates a top view of a damaged article according to another embodiment of the invention.
Figure 3B:
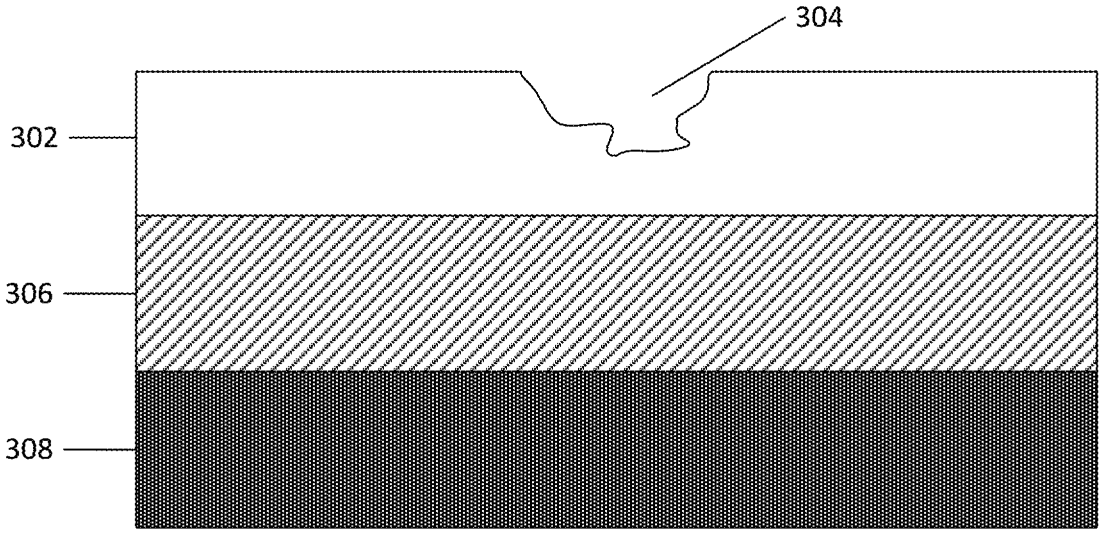
FIG. 3B illustrates a cross sectional view along line A to A' of the damaged article of FIG. 3A.
Figure 3C:
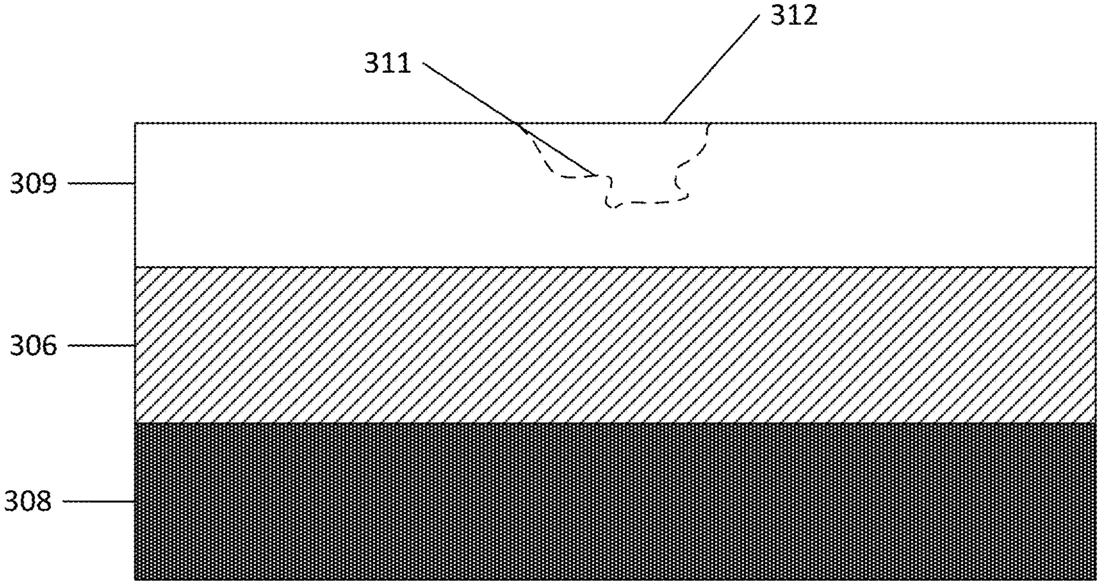
FIG. 3C illustrates a cross sectional view along line A to A' of the repaired article of FIG. 3A.
Figure 3D:
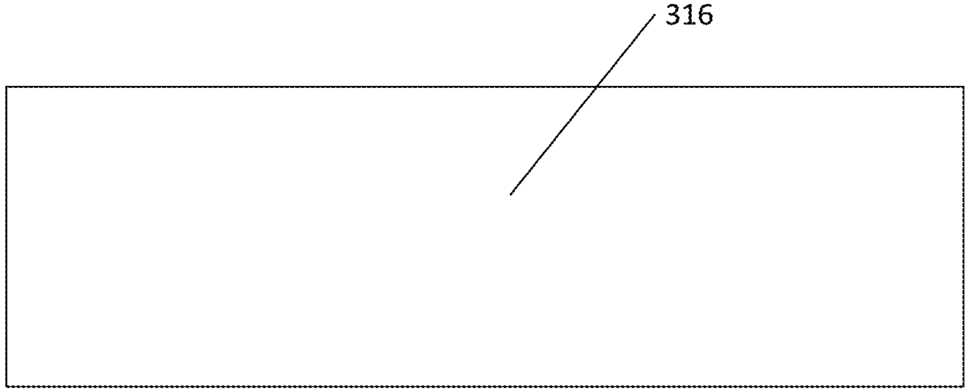
FIG. 3D illustrates a top down view of the repaired article.

FIG. 3A illustrates a top view of a damaged article accordingly article according to another embodiment of the invention. FIG. 3B illustrates a cross sectional view along line A to A' of the damaged article of FIG. 3A. FIG. 3C illustrates a cross sectional view along line A to A' of the repaired article of FIG. 3A. FIG. 3D illustrates a top down view of the repaired article.

Referring to FIGS. 3A and 3B, the article 300 includes a cured VOC free low radiant flux UV coating 302 that has damage 304 or a damaged region 304. The article 300 includes a cured coating 302 on a substrate 306. The substrate 306 may include any type of substrate, e.g., decorative material, cement, fiberglass, composite material, wood, veneer, metal, alloy, man-made fiber board, high density fiber board, medium density fiber board, low density fiber board, cardboard, chipboard, particle board, Masonite, cement fiber board, Mindy board and combinations of the same. Optionally and/or alternatively, the substrate may include a honeycomb substrate made from alloy, aluminum alloy, composite, fiberglass, carbon fiber, thermoplastic, wood, metal and combinations of the same with a wood veneer material adhered to the substrate.

In this embodiment, the cured coating was already present and formed by applying a radiation energy source in a range from about 360 nm to about 420 nm at a surface power density less than about 40 mW/cm$^2$ to the VOC free low radiant flux UV cured material. In a preferred embodiment, the VOC free low radiant flux UV cured material includes an acrylate monomers/oligomers, a thiol monomers/oligomers, a photo initiator, and a radical inhibitor. Of course, other curing energies, surface power densities, and/or additives may also be utilized as described herein.

Optionally and/or alternatively, an additional substrate 306 was present. The additional substrate 306 can be any substrate as described herein. In this embodiment, the substrate 304 includes a honeycomb structural material and the substrate 306 is a decorative material, e.g., wood veneer, adhered to a surface of the substrate 304. The cured coating 302 includes does not have definitive visible layers or a series of layers as would be present in a conventional urethane, VOC laden coating or non-radiation cured coating.

The damage 304 is a three-dimensional damage and has a dimension into the bulk surface of the coating 302 and also no damage on the substrate 306. That is, the substrate 306 or 304 in this embodiment is not damaged in this embodiment.

Referring now to FIG. 4, the damaged article 300 is repaired with reference to 400. In this embodiment, the damaged article 300 is provided having a damaged region 304 (step 402). In step 404, the damaged article 300 is cleaned as described herein. Preferably, the surface 302 of the damaged article 308 is cleaned with IPA. Referring to FIG. 3B, the cleaned surface is prepared further (in step 406) to remove any rough surfaces, jagged edges and/or other damage to the damaged article. In this embodiment in step 406 maybe done with a mechanical mechanism, e.g., sanding with an abrasive material, razor blade, knife, or heat source and/or other treatment techniques. In step 408 the prepared article and/or surface is cleaned as described herein, e.g., with IPA.

In this embodiment, there is no damage to the substrate 306 or 308.

However, if there was damage to the substrate 306 or 308 it could be repaired in optional step 410.

In step 412, the surface is now prepared for receiving the VOC free low radiant flux UV cured material by roughening the surface of the coated article to promote adhesion. In a preferred embodiment this may be done with an abrasive material, e.g., sand paper. In a more preferred embodiment, the coating 302 is sanded with liquid grit abrasive. This step is also optional.

In step 414, a VOC free low radiant flux UV material is applied to the substrate by any conventional technique, e.g., spray, paint brush, dip, bath, roller, combinations of the same or the like, to a first thickness to fill the damaged region 304. In a preferred embodiment, the thickness of the wet coating is in a range from about 2 mils to about 5 mils or less and only partially fills the damaged coating. That is a conformal coating is applied. Next, in step 416 a radiation energy source having wavelength in a range from about 360 nm to about 420 nm at a surface power density less than about 40 $mW/cm^2$ was applied cure the material for about two minutes or less. In a preferred embodiment, the VOC free low radiant flux UV cured material includes an acrylate monomers/oligomers, a thiol monomers/oligomers, a photo initiator, and a radical inhibitor. Of course, other curing surface power densities, curing times and/or additives may also be utilized as described herein. Steps 414 and 416 are repeated until the desired thickness is achieved. In a preferred embodiment, steps 414 and 416 are repeated until the added cured material has a thickness that is about 2 mils to about 4 mils or greater than the surface of the preexisting cured material 302. Optionally and/or alternatively, the energy source may be pulsed, ramped non-linearly, ramped linearly or combination as described herein.

Next in step 418 the article is cleaned with water, IPA and/or acetone. In step 420 any excess material (2 mils or greater) is removed, e.g., by an abrasive material. In a preferred embodiment, the surfaces 309 and 312 are planarized in step 420 by sanding and/or polishing with a series of abrasive materials, e.g., starting with a course abrasive and ending with a fine abrasive. In a preferred embodiment the dry sanding includes sanding with one or more of six different grits ranging from 600 grit to 2000 grit. In a more preferred embodiment, the dry sanding components include a 600 grit material, 800 grit material, 1000 grit material, 1200 grit material, 1500 grit material, and 2000 grit material. Next in step 422 the article is cleaned with a material such as water, IPA and/or acetone.

Optionally, the article with the repaired coating is polished (step 424) with a liquid polish to any desired shine. Referring now to FIG. 3C, there is no visible discountinuity 311 between the repaired coating 312 and the original coating 308. This is believed to be due to the cross-linked nature of the cured coating. By way of example, referring to FIG. 3D there is no visible to a human eye discountinuity between the repaired coating 312 and the original material 308 as shown 316. This is in direct contrast to the related art. One problem with the conventional coatings is that any repair would show to the human eye a stop and start line in pattern, e.g., bullseye pattern, which is believed to be caused by the solvents present in at least one or more of the original coating or repair coating.

It is believed the discontinuities are due to the solvents in the conventional material as they will show a margin line or discountinuity region or other imperfection between the original material and the repaired material. It is believed that this is due to one's inability to polish solvents. In contrast, in embodiments of this invention there is no or virtually no discountinuity present between the original coating and the repaired coating as full polishing is possible as there is approximately one hundred percent solids in the cured repaired coating and the original coating as shown in FIG. 3C and FIG. 3D. This also means there are no visible discontinuities to the human eye present between the repaired material and the original material when looking at the repaired material from a top down view, angle view, side view or any combination view (FIGS. 3C and 3D). As used herein the discontinuities can be characterized as a stop and start line, margin line, or other visible imperfection between the repaired region and the original region.

One embodiment is directed towards repairing a damaged region, e.g., structural breaks, punctures in composite bathware fiberglass, acrylic products and the like. In this embodiment, one or more steps 402, 404, 406, 408, 410, and 412 is conducted. Next, a composite material as described herein is used by applying the VOC free low radiant flux UV material to the composite material by soaking or impregnating the material. The composite impregnated material may be applied to release material (preferably transparent to UV radiation). The impregnated material is cured with an energy source as described herein. The cured rigid composite material now a patch material is trimmed and sized to fit in cavity of the damaged material. The patch material is covered with the VOC free low radiant flux UV material to cover the cavity or resides within a portion of the cavity and cured with an energy source described herein. A skim coating of pigmented VOC free UV Curable Composition paste matching the outer surface can be used and applied with a skim coat until level with surface. This is cured with an energy source as described herein.

Figure 5:
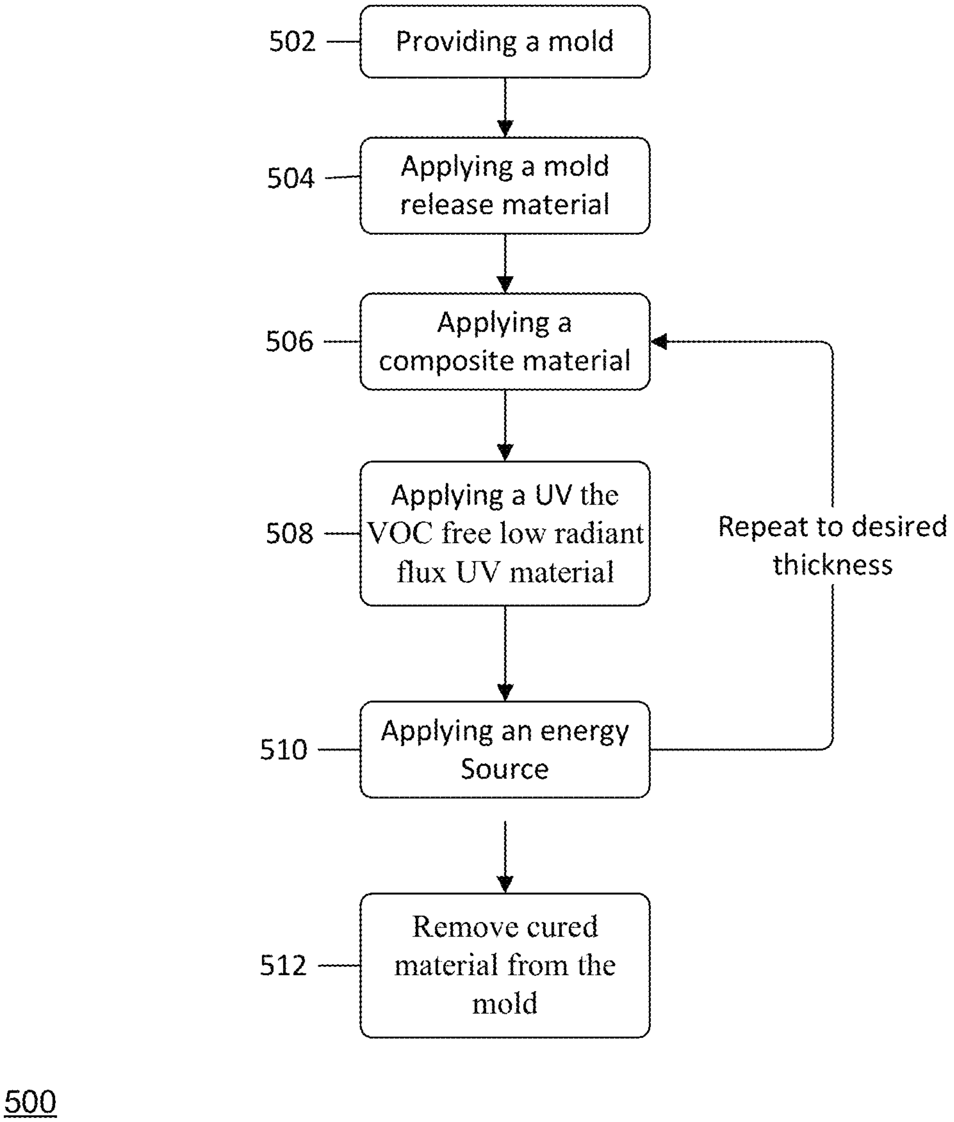
FIG. 5 illustrates a method of forming a composite apparatus according to an embodiment of the invention.

FIG. 5A illustrates a method of forming a composite apparatus according to an embodiment of the invention.

Referring to FIG. 5A, the composite article is formed with reference to a method 500. The method 500 includes a providing a composite mold (step 502) and applying a mold release material (step 504) to at least a portion of the mold. The mold release material is a material configured to prevent the VOC free low radiant flux UV material from sticking to the mold when forming a composite. In a preferred embodiment, the mold release agent is energy transparent allowing an energy source having wavelength in a range from about 360 nm to about 420 nm to pass through the mold release agent with minimal interference.

Applying the mold release step 504 is optional as it is utilized to assist the release the formed material from the mold. The mold release agent is known in the art and in preferred embodiment, includes an aqueous mixture of water and acetone such as Rain-X® 2-N-1 Glass Cleaner+ Rain Repellent.

In step 506 a composite material is arranged on a surface of the mold. The composite material may include one or more layers. The orientation of the layers may change as relative to each other. For example, the orientation of the first layer may be different, e.g., angled, orthogonal, to the orientation of the second layer. The composite material may include a semi-synthetic fiber, a cellulose fiber, a fiberglass fiber, a carbon fiber, synthetic fiber, a metallic fiber, a silicon carbide fiber, a mineral fiber, polymer fiber, a microfiber and combinations of the same. In step 508, the VOC free low radiant flux UV material is applied to the composite to substantially saturate or soak the material. In step 506, the composite material may in of a semi-synthetic fiber, a cellulose fiber, a fiberglass fiber, a carbon fiber, synthetic fiber, a metallic fiber, a silicon carbide fiber, a mineral fiber, polymer fiber and a microfiber. Optionally and/or alliteratively, the composite material and the VOC free low radiant flux UV material can be applied in a single step, e.g., a pre-impregnated material described herein.

In step 510 a radiation energy source having wavelength in a range from about 360 nm to about 420 nm at a surface power density less than about 40 mW/cm$^2$ was applied to cure the material for about two minutes or less. In a preferred embodiment, the VOC free low radiant flux UV cured material includes an acrylate monomers/oligomers, a thiol monomers/oligomers, a photo initiator, and a radical inhibitor. Of course, other curing surface power densities, curing times and/or additives may also be utilized as described herein. Steps 506, 508 and 510 are repeated until the desired thickness of composite material is achieved. Optionally and/or alternatively, the energy source may be pulsed, ramped non-linearly, ramped linearly or combination as described herein. Optional additional components may include glass/silica fillers and pigments to the material.

Optionally and/or alternatively, the energy source may be applied simultaneously to a first and second opposite side of the saturated composite material with a UV transparent mold. A UV transparent mold is configured to allow an energy source having wavelength in a range from about 360 nm to about 420 nm to pass through the mold. The mold may be made from a thermoplastic material or may be glass.

Optionally and/or alternatively, the mold includes a vacuum bag and vacuum source that uses a negative pressure to hold the coated composite prior to curing in place until it cures. The vacuum bagging also assists with saturating or soaking the VOC free low radiant flux UV material into the composite material. In this embodiment, the vacuum bag would be UV transparent bag configured to allow an energy source having wavelength in a range from about 360 nm to about 420 nm to pass through the bag. Optionally and/or alternatively, the mold includes an autoclave mold.

In one embodiment, the mold may be configured to form a part or any geometric shape. Some typical examples of a mold shapes include a bathware mold, such as a tube, sink, shower stall, a boat haul mold, a swimming pool mold, a spa mold, an aircraft component mold, a windmill component mold, such as a windmill blade mold, automotive part mold, an automotive fender, an automotive body mold, and a part mold.

In step 512 the cured composite material is released from the mold.

In one embodiment, using the steps 502, 504, 506, 508, 510 and 512 one or more of a boat haul, airfoil, part or other device can be fabricated.

Figure 6:
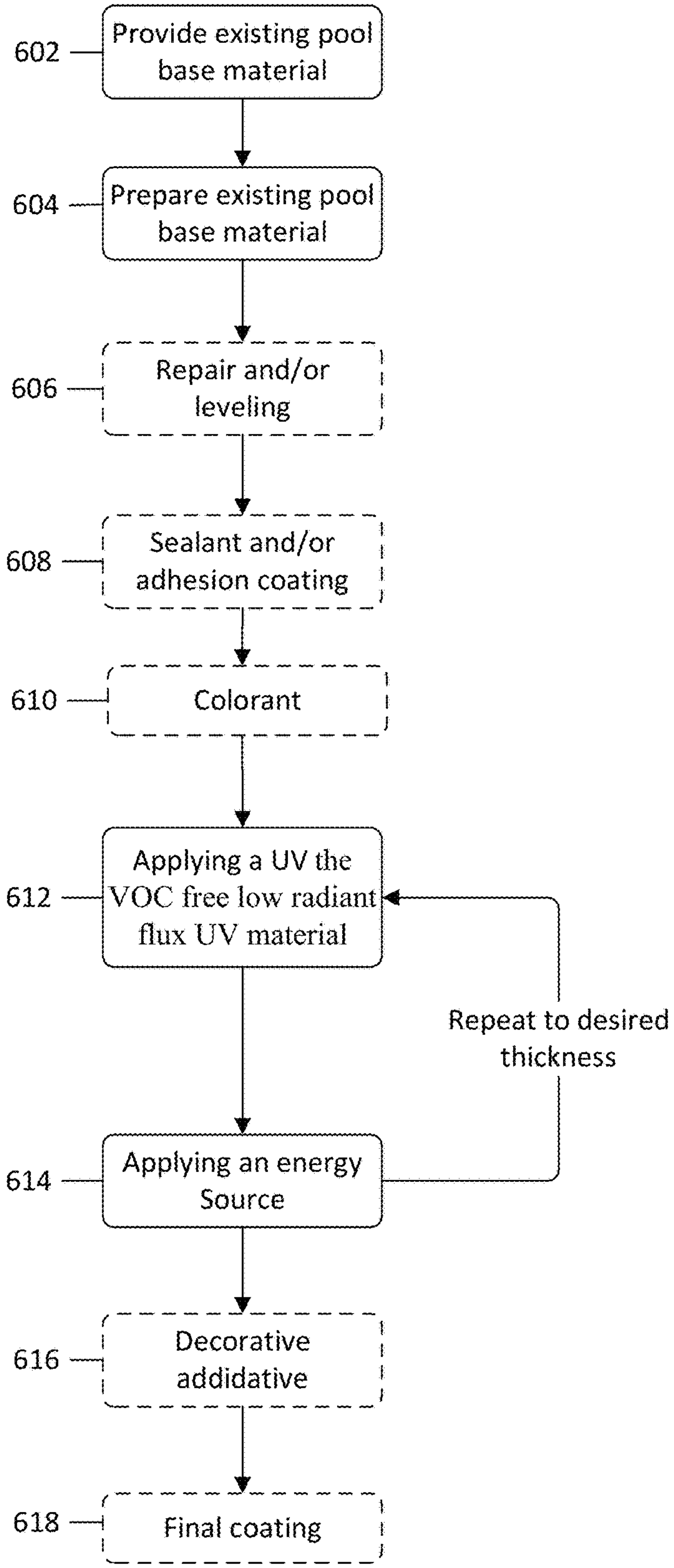
FIG. 6 illustrates a method of resurfacing a swimming pool or spa according to an embodiment of the invention.

FIG. 6 illustrates a method of resurfacing a swimming pool or spa according to an embodiment of the invention.

A pool or spa resurfacing or remolding method is generally described with reference to method 600. The main types of in-ground swimming pools base material include a fiberglass material, a shotcrete material, a concrete material, a gunite material and a vinyl liner material.

Gunite is a mixture of sand and concrete that can be poured into any shape, which makes them popular. Typically, after the pool is formed with the base material and plaster is shot and troweled to finish the pool when the base material is shotcrete, concrete, and/or gunite. Other types of material including pebbles and quartz plaster may be used to finish the pool. Plaster is least effective when it comes to life of the pool lasting about 5 years, pebbles last about 10 years and quartz and plaster lasts about 7 years. The coating of the pools needs to be replaced as plaster has surface irregularities overtime, which may take on a beige hue caused by chemical etching. That is, the chemical etching can be caused by low pH or alkalinity; an acidic condition in the pool. It may begin within the plaster, from the original mix on application, or etching may start from the gunite side of the plaster and work itself from the outside in. Plaster etching can also be the result of aggressive or improper acid washing.

One embodiment of the invention is directed towards a method of using the VOC free low radiant flux UV curable material to coat, resurface, surface and/or repair an existing pool base material including one or more of a fiberglass material, a shotcrete material, a concrete material, a gunite material and a vinyl liner material. Referring now to FIG. 6, the method 600 includes providing or forming an existing pool base material (step 602). This may include draining an existing pool or forming an existing pool out of one more of the existing pool base materials. The existing pool base materials now need to be prepared in step 604. The preparing step 604 is dependent on whether the existing pool base material is being resurfaced or new and type of the existing pool base material.

When resurfacing a plaster coated existing pool base material, step 604 includes removing at least a portion of the old plaster and/or color coat. The removing may be done with conventional equipment as known in the art, sander, disc grinder, e.g., 30 grit disc, sand blaster and/or other tool. Next the surface having the removed plaster is washed and/or washed, e.g., pressured washed, with a cleaning solution, e.g., acidic cleaning solution, and allowed to dry.

When resurfacing a fiberglass or vinyl existing pool material without a top plaster coating, step 604 includes cleaning the surface of the existing pool base material fiber. This cleaning and preparation may be done with water, a cleaning solution, and/or an abrasive material.

Optionally, in step 606 the cleaned surface, from step 604, is leveled with a leveling agent, e.g., a skim coating, over defects or unlevel surfaces to level and/or repaired to correct any defects in either the existing pool material or existing plaster. The leveling agent is known in the art.

Optionally, the cleaned surface from step 604 material is sealed with a sealant material (step 608) as known in the art and/or an adhesion promoter is utilized. In preferred embodiment, the sealant material is the UV VOC free low radiant flux UV material described herein applied in a thin layer and allowed to cure in the ambient sunlight and/or with energy sources described herein. In one embodiment, the adhesion promoter is configured to promote adhesion of the UV VOC free low radiant flux UV material to the cleaned surface and/or the sealed surface.

Optionally, the surface from steps 604, 606 or 608 is coated with a primer, colored primer, and/or other colorant. This step 610 enables one to change the color of an existing surface. However, this step 610 is optional and the coloring can be done a pigmented UV VOC free low radiant flux UV material.

Next in step 612 a UV the VOC free low radiant flux UV material is applied to the surface from step 604, 606, 608, or 610 to a desired thickness. Prior to applying the UV the VOC free low radiant flux UV material to the surface, pool, partial pool and/or entire pool is covered with a UV protective barrier. The UV protective barrier may be a tent, mechanical cover, existing pool cover, that is covered to block UV radiation to prevent curing. This material may be applied with any conventional techniques, e.g., roller, paintbrush, spray or other techniques.

In one embodiment, the composite material may include one or more of a semi-synthetic fiber, a cellulose fiber, a fiberglass fiber, a carbon fiber, a synthetic fiber, a metallic fiber, a silicon carbide fiber, a mineral fiber, a polymer fiber, a microfiber and combinations of the same or the like. The composite material may be configured as patch, sheet, cloth, woven, non-woven or other orientation or configurations.

Next, in step 614 a radiation energy source having wavelength in a range from about 360 nm to about 420 nm at a surface power density less than about 40 mW/cm$^2$ is applied to cure the material for about two minutes or less. Optionally and/or alternatively, the radiation energy may be ambient sunlight. In a preferred embodiment, the VOC free low radiant flux UV cured material includes an acrylate monomers/oligomers, a thiol monomers/oligomers, a photo initiator, and a radical inhibitor. Of course, other curing surface power densities, curing times and/or additives may also be utilized as described herein. Optionally and/or alternatively, the radiation energy may be ambient sunlight. Steps 612 and 614 are repeated until the desired thickness is achieved.

Optionally and/or alternatively, in step 616 a decorative material is applied to a non-cured VOC free low radiant flux UV cured material prior to coating or after coating in this step. The decorative material may include glitter, metallic flakes, thermoplastic flakes, beads, glass beads, thermoplastic beads, decals, stickers, organic pigmented materials, synthetic pigmented materials of any color or any combination of the foregoing. The decal and/or sticks can be custom configured with a logo or any type of graphic. Optionally and/or alternatively, the UV curable composition further includes a pigment configured to color the surface of the coating, e.g., up to 5% by volume to create a transparent tone to a solid colored coating; any color may be achieved, e.g., red, blue, green and any combination. In a preferred embodiment, the surface is white or blue. The coating will withstand harsh and destructive elements, e.g., sea water, steam, non-diluted muriatic acid, and the like.

Optionally and/or alternatively, step 618 includes applying a final clear coat and curing the same to cover the decorative coating. This step 618 is done as similarly described with regard to steps 612 and 614.

Figure 7:
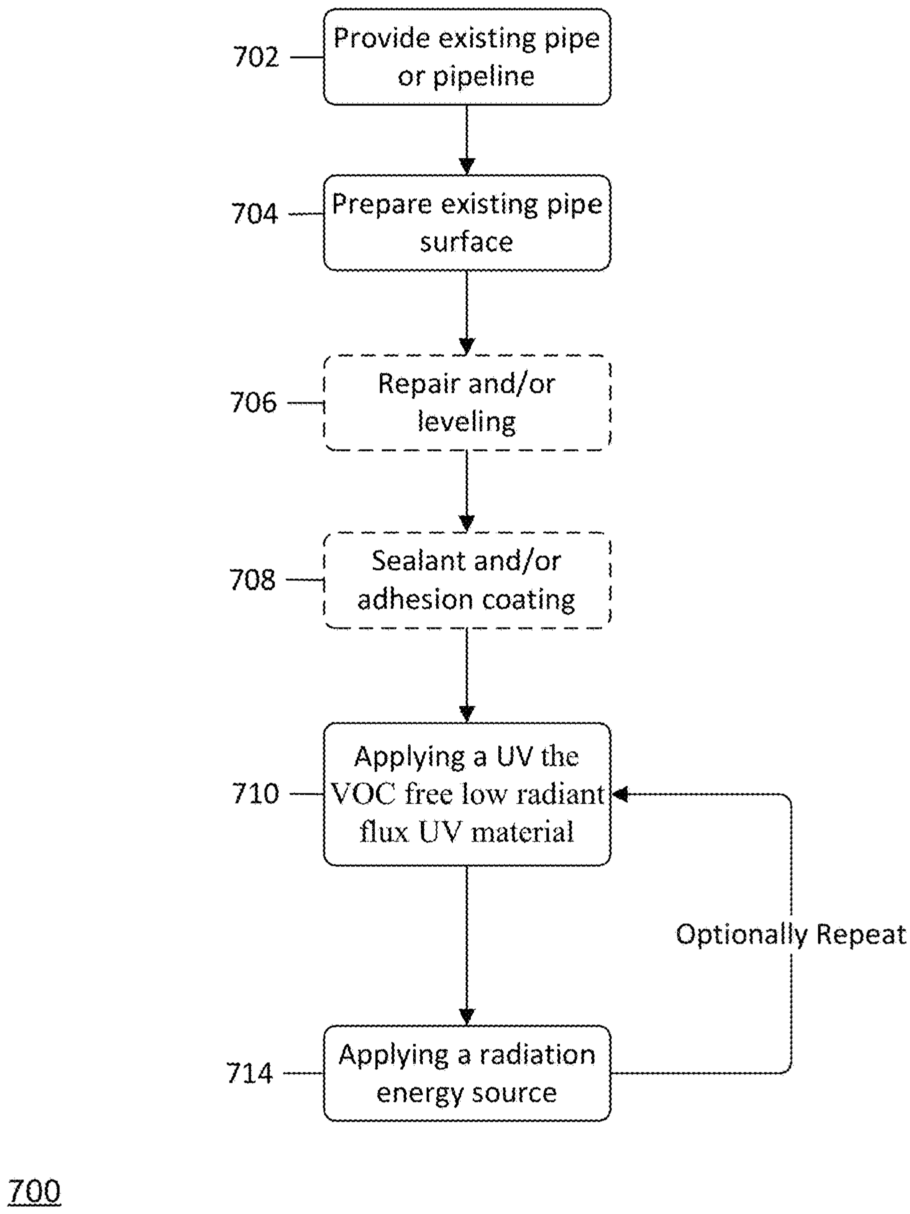
FIG. 7 illustrates a method of repairing a pipe or pipeline according to an embodiment of the invention.

FIG. 7 illustrates a method of repairing a pipe or pipeline according to an embodiment of the invention.

Referring to FIG. 7, the method 700 includes in providing an existing pipe or pipeline (step 702). The pipe or pipeline may be constructed from cement material, e.g., a sewer, fiberglass, or thermoplastic or other material. If treating the external surface of the pipe this step may include excavating material around the pipe to provide access to the region or portion of the pipe to be repaired. Optionally and/or alternatively, this method can be used as a reinforcement mechanism to reinforce pipe or pipeline adding strength.

In step 704 the existing pipe or pipeline surface is prepared. This step may vary somewhat depending on the size of the pipe and whether the internal or external portion of the pipe is being prepared. When treating an external portion of the pipe or pipeline the exposed surface of the pipe is clean and/or abraded to remove existing coatings or debris. The cleaning may be accomplished with mechanical mechanisms including sanders, grinders, particle blasting and other techniques known in the art. The surface is now cleaned with water, IPA, acetone and combinations of the same to remove dust and other containments.

Next the surface is allowed to dry naturally or with the aid of heater. If treating an internal portion of the pipe or pipeline the exposed surface of the pipe is cleaned and/or abraded to remove existing coatings or debris. The cleaning may be accomplished with mechanical mechanisms including sanders, grinders, particle blasting and other techniques known in the art. The surface is now cleaned with water, IPA, acetone and combinations of the same to remove dust and other containments. In a preferred embodiment, a texture, e.g., a roughened surface, is applied to the pipe or pipeline to promote mechanical adhesion of the coating to be applied.

Optionally step 706 is performed if the pipe or pipeline has damaged regions they can be fixed by patching as described herein and/or filing voids as described herein with reference to FIGS. 2A to 4 and related text.

Optionally in step 708 depending on the pipe or pipeline material to be treated a sealant and/or adhesion coating can be applied. The cleaned surface of the pipe or pipeline is sealed with a sealant material (step 708) as known in the art and/or an adhesion promoter is utilized as known in the art. In preferred embodiment, the sealant material and/or adhesion promoter is the UV VOC free low radiant flux UV material described herein applied in a thin layer (2 mils or less) and allowed to cure in the ambient sunlight and/or with energy sources described herein.

In step 710 the existing pipe or pipeline surface is treated by applying the UV VOC free low radiant flux UV material to the pipe. This step may vary somewhat depending on the size of the pipe and whether the internal or external portion of the pipe is being prepared. When treating an external portion of the pipe or pipeline the UV VOC free low radiant flux UV material to the pipe can be applied by pre-impregnated (pre-peg) roll or patch of composite material (described herein) that is saturated with a UV VOC free low radiant flux UV material. In a preferred embodiment, the roll is in a range from about 2 ft. to about 20 ft or more in width and has a diameter from about 1 foot or greater. The role is pre-peg of composite material saturated with the UV VOC free low radiant flux UV material and packed in a UV radiation blocking material, e.g., foil or other UV blocking material.

In step 710 the prep-preg material can include one or more layers of composite material. The orientation of the layers may change as relative to each other. For example, the orientation of the first layer may be different, e.g., angled, orthogonal, to the orientation of the second layer. The composite material may include one or more a semi-synthetic fiber, a cellulose fiber, a fiberglass fiber, a carbon fiber, synthetic fiber, a metallic fiber, a silicon carbide fiber, a mineral fiber, polymer fiber, a microfiber and combinations of the same. Pre-peg substantially saturated or soaked with the UV VOC free low radiant flux UV material. Optionally and/or alternatively, the coating may be only the UV VOC free low radiant flux UV material without a composite material, the UV VOC free low radiant flux UV material arranged over a composite material that is not a pre-peg material or any combination.

In this embodiment, the pre-peg material is wrapped in an overlapping spiral fashion such that at least a portion of the pre-peg material overlaps each other, e.g., a portion of the pre-peg material overlaps another portion of the pre-peg material in a spiral fashion.

This wrapping is applied under a UV shade, tent or other UV blocker to prevent curing.

Next, in step 714 a radiation energy source having wavelength in a range from about 360 nm to about 420 nm at a surface power density less than about 500 mW/cm$^2$ is applied to cure the material for about two minutes or less. In a preferred embodiment, the energy surface power density is less than about 40 mW/cm$^2$. Optionally and/or alternatively, the radiation energy may be ambient sunlight. In a preferred embodiment, the VOC free low radiant flux UV cured material includes an acrylate monomers/oligomers, a thiol monomers/oligomers, a photo initiator, and a radical inhibitor. Of course, other curing surface power densities, curing times and/or additives may also be utilized as described herein. Steps 710 and 714 can also be repeated until the desired thickness is achieved.

In step 710 the existing pipe or pipeline surface is treated with by applying the UV VOC free low radiant flux UV material to internal surface of the pipe. This can be done by apply with any conventional technique and/or a pre-impregnated (pre-peg) roll or patch of composite material (described herein) that is saturated with a UV VOC free low radiant flux UV material. The roll pre-peg material can be in a sock configuration having a desired length and diameter. The pre-peg is applied with an airbladder that expands and presses the outside diameter of sock on the internal diameter of the pipe or mechanically applied.

Next in step 714 a radiation energy source having wavelength in a range from about 360 nm to about 420 nm at a surface power density less than about 500 mW/cm$^2$ is applied to cure the material for about two minutes or less. In a preferred embodiment, the energy surface power density is less than about 40 mW/cm$^2$. Of course, other curing surface power densities, curing times and/or additives may also be utilized as described herein.

Steps 710 and 714 can also be repeated until the desired thickness is achieved.

EXAMPLES

Without intending to limit the scope of the invention, the following examples illustrate how various embodiments of the invention may be made and/or used.

Example 1

This Example 1 illustrates the manufacture of three separate test articles prepared for a twelve (12) second vertical flammability test. Each of the test articles was coated with BlueSky Armor™ 1027 Clear Top Coat out of Boulder, Colorado, including acrylate monomers/oligomers, thiol monomers/oligomers, photo initiators and radical inhibitors. Each of the test articles had a substrate that was 3 inches by 12 inches. The substrate was an aluminum honeycomb panel from Teklam Corporation: P.O. 6520, P/N AA207-33-500A, Job No. T017654-1-1 (Mfg Date Sep. 26, 2012). A birdseye maple veneer from Goodrich Corporation: Kig No. PIR-111116-1-Nov. 16, 2011, having a back and core fire treated was adhered to a first surface of each of the test articles using a 3M: Hi-Strength 90 contact adhesive and left to dry for about 10 hours.

The veneered surface was treated with a first coat of the material with a conventional high-volume, low-pressure (HVLP) automotive spray gun at a distance of about six to twelve inches to form a medium wet coat of about 2 mils to about 4 mils thickness.

Next, the surface was cured with a low intensity UV light source having a wavelength in a range from about 360 nm to about 405 nm at a surface power density at 3 mW/cm$^2$ for about 30 seconds to about 60 seconds. After the curing the first coating was completely cured and tack free. Tack free was tested by checking the cured coating every 15 seconds or less by touching the surface of the coating. If the sample was marred in any way the material was considered tacky. This coating and curing step was repeated seven additional times to form a cured coating having a thickness of about 20 mils to 25 mils. The total cure time for the coating was about 210 seconds. Each of the three coated veneer articles were tested by Skandia Laborites under the Vertical Flame Test codified at 14 C.F.R. Part 25.853 (a) Amdt 25-116 Appendix F Part I (a)(1)(ii). The results of the test are shown in Table 1.

TABLE 1

| Scandia Test Results for 12 Second Vertical Burn: | | | | |
|---|---|---|---|---|
| Set | Flame Application (seconds) | Flame Time (seconds) | Burn Length (inches) | Drip Flame Time (seconds) |
| 1 | 12 | 0.0 | 0.2 | 0.0 |
| 2 | 12 | 0.0 | 0.2 | 0.0 |
| 3 | 12 | 0.0 | 0.3 | 0.0 |
| | Average: | 0.0 | 0.2 | 0.0 |

As shown in Table 1, each of the three articles passed the 12 second Vertical Flammability Test. Accordingly, each of the tested articles is fire resistant, since each passed the 12 second Vertical Flammability Test. In addition, the test proves that each of the tested articles had a flame time of 0 seconds and drip flame time of 0 seconds. Accordingly, it was determined that the applied coating has a dual purpose of a single stage coating, which is a clear coat, and fire retardant or resistant coating in one step. Moreover, this article can be used in the aerospace industry as it passed the 12 second Vertical Flammability Test.

Example 2

This Example 2 illustrates the manufacture and testing of three test articles for a 60 second vertical flammability test and its results. The test article was coated with BlueSky Armor™ 1027 Clear Top Coat out of Boulder, Colorado, including acrylate monomers/oligomers, thiol monomers/oligomers, photo initiators and radical inhibitors.

Each of the three test articles was made with a separate substrate that was 3 inches by 12 inches. Each of the substrates was an aluminum honeycomb panel from Teklam Corporation:

P.O. 6520, P/N AA207-33-500A, Job No. T017654-1-1 (Mfg Date Sep. 26, 2012). A birdseye maple veneer from Goodrich Corporation: Log No. PIR-111116-1-Nov. 16, 2011, back and core fire treated was adhered to a first surface of the substrate using substrate adhesive from 3M: Hi-Strength 90 contact adhesive, and left to dry for about 10 hours.

The veneered surface was treated with a first coat of the composition with a conventional HVLP automotive spray gun at a distance of about six inches to form a medium wet coat of about 2 mils to about 4 mils. Next, the surface was cured with a low intensity UV light source having a wavelength in the range from about 360 nm to about 405 nm at a surface power density of 3 mW/cm$^2$ for about 30 seconds to about 60 seconds. After curing the coating was completely cured and tack free. Tack free was tested as described herein.

This coating and curing step was repeated seven additional times to form a thickness of about 20 mils to 25 mils. The total cure time for the coating was about 210 seconds. This coated veneer article was tested by Skandia Laborites under the codified 60 second Vertical Flame Test codified at 14 C.F.R. Part 25.853 (a) Amdt 25-116 Appendix F Part I (a)(1)(ii). The results of the test are shown in Table 2.

TABLE 2

| Scandia Test Results for 60 Second Vertical Burn: | | | | |
|---|---|---|---|---|
| Set | Flame Application (seconds) | Flame Time (seconds) | Burn Length (inches) | Drip Flame Time (seconds) |
| 1 | 60 | 0.0 | 1.2 | 0.0 |
| 2 | 60 | 0.0 | 1.6 | 0.0 |
| 3 | 60 | 0.0 | 1.5 | 0.0 |
| | Average: | 0.0 | 1.4 | 0.0 |

Each of the test articles passed the 60 second Vertical Flammability Test.

Accordingly, each of the test articles is fire resistant as it passed the test. In addition, the test shows each of the articles had a flame time of 0 seconds and drip flame time of 0 seconds.

Therefore, the applied coating had a dual purpose single stage coating; the dual purpose was a clear coat and fire retardant or resistant coating. This article can be used in the aerospace industry as it passed the 60 second Vertical Flammability Test.

Example 3

This Example 3 illustrates the manufacture of a test article for treatment with acid to show durability, chemical resistant and permeability of the coating. In this Example, a USG Durock® Brand Cement Board about a ½ inch thick board cut to about 3 inches wide by 10 inches long was used. A copper-plated zinc United States penny was arranged on one surface of the cement board and the cement board was treated on all sides, front, back, and sides, with a first coat of BlueSky Armor™ 1027 Clear Top Coat out of Boulder, Colorado including acrylate monomers/oligomers, thiol monomers/oligomers, photo initiators and radical inhibitors. The composition was applied with a brush to a thickness of about 8 mils or more. Next, the surface was cured with a low intensity UV light source having a wavelength in the range from about 360 nm to about 405 nm at a surface power density of 3 mW/cm$^2$ for about 60 seconds. After curing the coating was completely cured and tack free in an oxygen environment. This coating and curing step was repeated two additional times to increase the thickness of the coating to about 30 mils. The final test article included a completely coated cement substrate with a copper-plated zinc coin adhered to the substrate and also coated.

The test article was submerged in muriatic acid from Klean Strip Green Muriatic Acid from W.M. Barr in Memphis, TN, for about five days. The test article was removed and cleaned with water and it showed zero signs of wear due to the muriatic acid: no deterioration, degradation, corrosion, staining, or color change was visible. In addition, a cement board described herein was also submerged without a coating and it was destroyed completely, almost immediately; the only item left was a webbing material, all cement was gone or deteriorated. This Example confirms that cured coating is non-permeable and chemically resistant to a pH of less than 1.

Example 4

In this Example the characteristics and properties of BlueSky Armor™ 1007 Clear Top Coat, BlueSky Armor™, 1027 Clear Top Coat, BlueSky Armor™ 1047 Clear Knife Grade Filler, and BlueSky Armor™ 1057 Laminating Resin from MSI Coatings, Inc. out of Boulder, Colorado, were quantified.

More specifically, an acrylate conversion versus time was determined with a Nicolet FTIR spectrometer to collect real time conversion data of MSI products. Conversion was determined using the acrylate functional group absorbance peak at about 6200 cm$^{-1}$. A first energy source with that was a 120 Watt LED light having a wavelength of 385-410 nm manufactured by ADJ UV Cob Cannon was used as the energy source and curing each of the materials at a low radiant flux at the surface of the material of 5 mW/cm$^2$, 10 mW/cm$^2$, and 20 mW/cm$^2$. A second energy source having a 30 Watt LED light having wavelength in a range from 385-410 nm LED light manufactured by ADJ Eco UV Bar 50 IR was used as the energy source for curing the material at a low radiant flux at the surface of 2.5 mW/cm$^2$. In this Example 4 four separate testing slides were made for each material. The light intensity in this Example was measured with an International Light model IL1400 with detector model XRL 140A.

Figure 8:
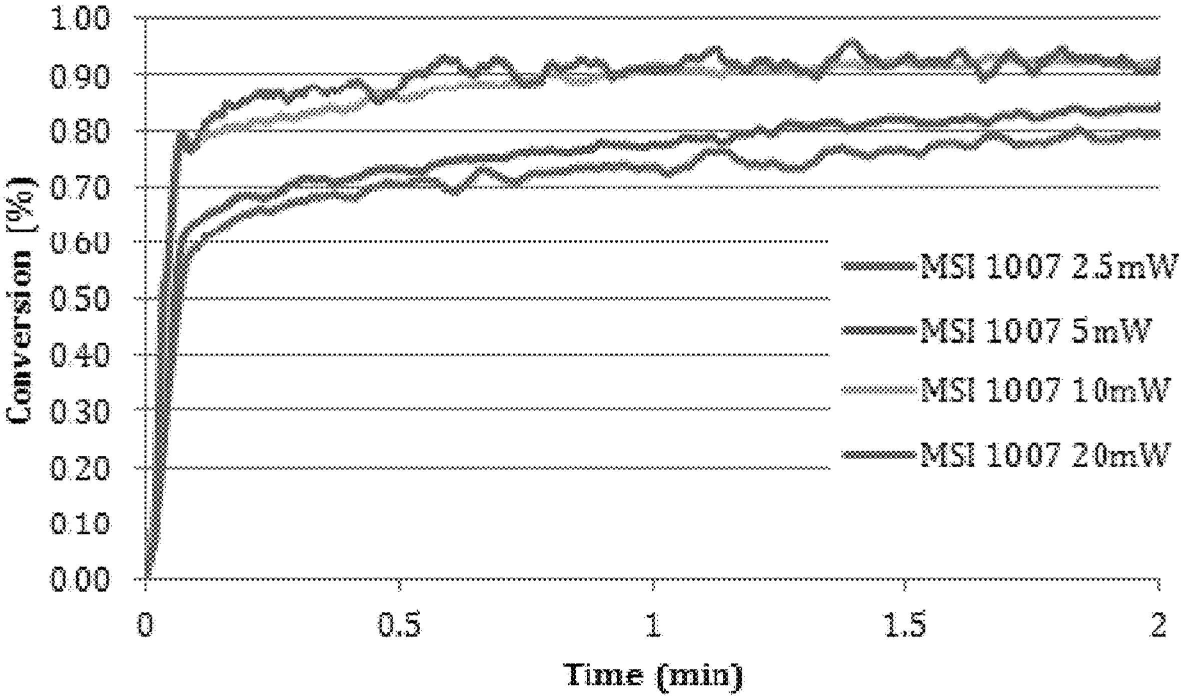
FIG. 8 illustrates an acrylate conversion versus time at various low radiation fluxes according to Example 4.

More specifically, BlueSky Armor™ 1007 Clear Top Coat uncured material was placed on Corning 2947-75X25 Soda Lime Glass Plain Microscope Slide that was 75 mm Length× 25 mm Width×0.90-1.10 mm thick. The uncured material was drawn down across the slide with an AccuDyne #100 wire-wound metering rod, so that the slide was completely and uniformly covered with the wet material to a thickness of about 0.25 mm. Next, the wet slide was placed in the Nicolet FTIR spectrometer and cured at a low radiant flux of 2.5 mW/cm$^2$ and real time conversion data was collected as shown in FIG. 8 and Table 1. This process was repeated with BlueSky Armor™ 1007 Clear Top Coat and the wet slide was placed in the Nicolet FTIR spectrometer and cured at a low radiant flux of 5 mW/cm$^2$ and real time conversion data was collected as shown in FIG. 8 and Table 1. This process was repeated with BlueSky Armor™ 1007 Clear Top Coat and the wet slide was placed in the Nicolet FTIR spectrometer and cured at a low radiant flux of 10 mW/cm$^2$ and real time conversion data was collected as shown in FIG. 8 and Table 1. This process was repeated with BlueSky Armor™ 1007 Clear Top Coat and the wet slide was placed in the Nicolet FTIR spectrometer and cured at a low radiant flux of 20 mW/cm$^2$ and real time conversion data was collected as shown in FIG. 8 and Table 1.

Figure 9:
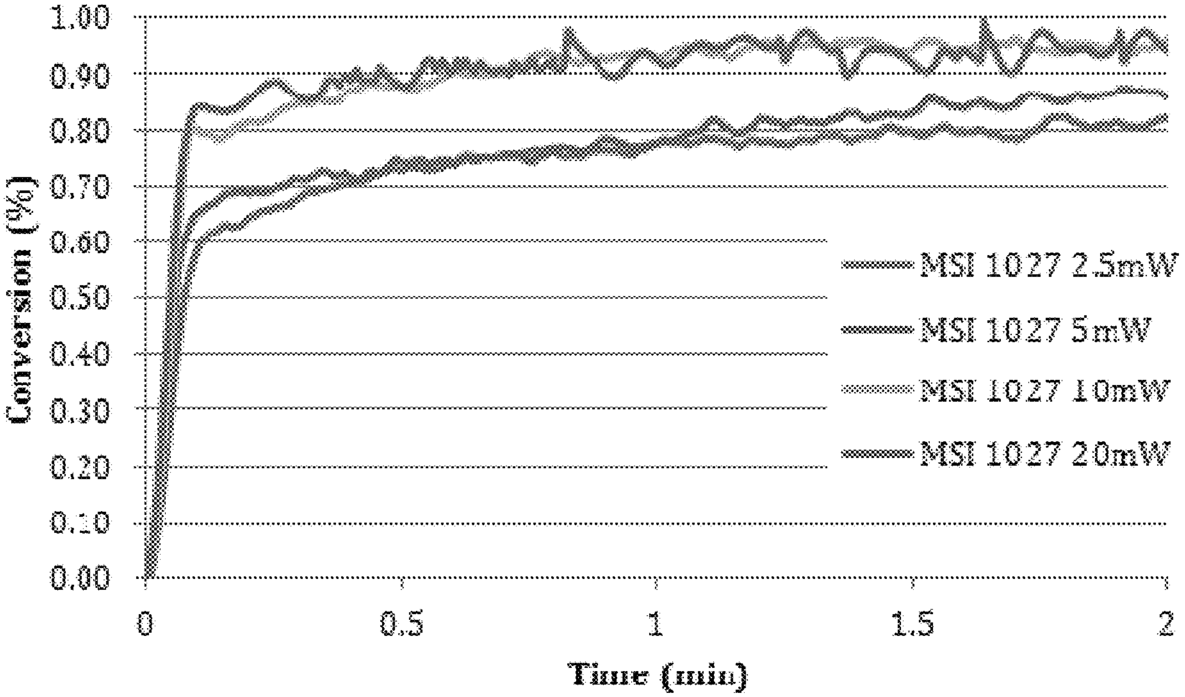
FIG. 9 illustrates an acrylate conversion versus time at various low radiation fluxes according to Example 4.

BlueSky Armor™ 1027 Clear Top Coat uncured material was placed on Corning 2947-75X25 Soda Lime Glass Plain Microscope Slide that was 75 mm Length×25 mm Width× 0.90-1.10 mm thick. The uncured material was drawn down across the slide with an AccuDyne #100 wire-wound metering rod, so that the slide was completely and uniformly covered with the wet material to a thickness of about 0.25 mm. Next, the wet slide was placed in the Nicolet FTIR spectrometer and cured at a low radiant flux of 2.5 mW/cm$^2$ and real time conversion data was collected as shown in FIG. 9 and Table 1. This process was repeated with BlueSky Armor™ 1027 Clear Top Coat and the wet slide was placed in the Nicolet FTIR spectrometer and cured at a low radiant flux of 5 mW/cm$^2$ and real time conversion data was collected as shown in FIG. 9 and Table 1. This process was repeated with BlueSky Armor™ 1027 Clear Top Coat and the wet slide was placed in the Nicolet FTIR spectrometer and cured at a low radiant flux of 10 mW/cm$^2$ and real time conversion data was collected as shown in FIG. 9 and Table 1. This process was repeated with BlueSky Armor™ 1027 Clear Top Coat and the wet slide was placed in the Nicolet FTIR spectrometer and cured at a low radiant flux of 20 mW/cm$^2$ and real time conversion data was collected as shown in FIG. 9 and Table 1.

Figure 10:
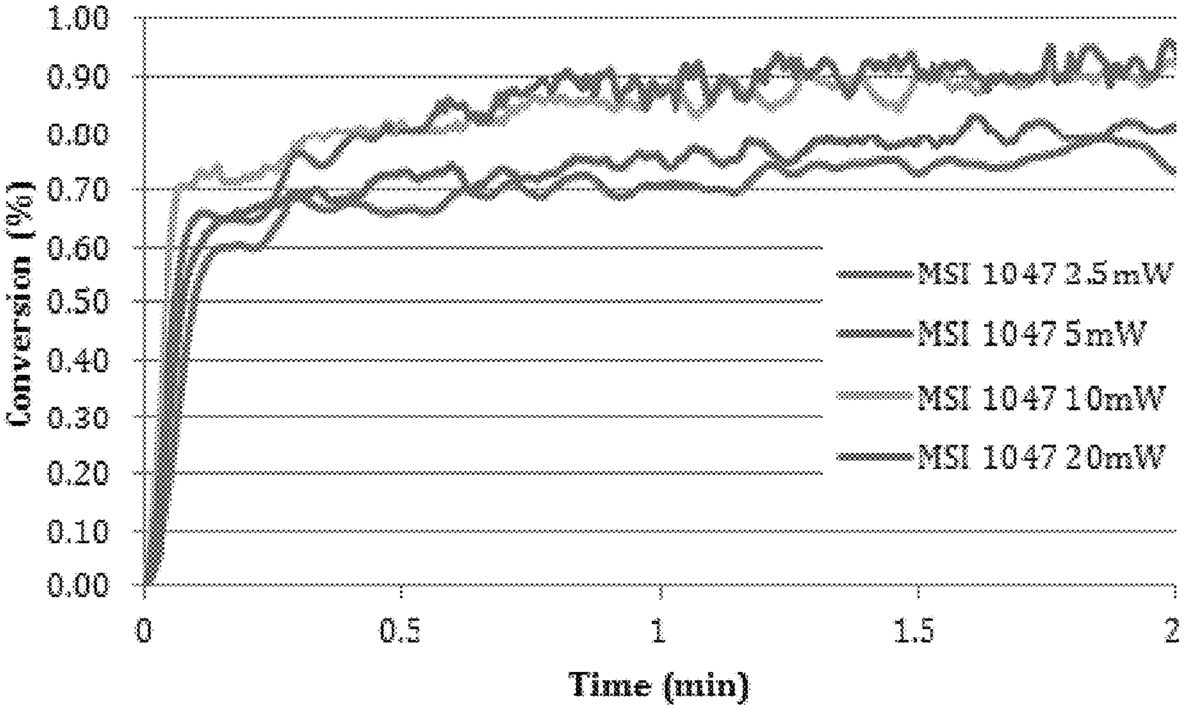
FIG. 10 illustrates an acrylate conversion versus time at various low radiation fluxes according to Example 4.

BlueSky Armor™ 1047 Clear Top Coat uncured material was placed on Corning 2947-75X25 Soda Lime Glass Plain Microscope Slide that was 75 mm Length×25 mm Width×0.90-1.10 mm thick. The uncured material was drawn down across the slide with an AccuDyne #100 wire-wound metering rod, so that the slide was completely and uniformly covered with the wet material to a thickness of about 0.25 mm. Next, the wet slide was placed in the Nicolet FTIR spectrometer and cured at a low radiant flux of 2.5 mW/cm$^2$ and real time conversion data was collected as shown in FIG. 10 and Table 1. This process was repeated with BlueSky Armor™ 1047 Clear Top Coat and the wet slide was placed in the Nicolet FTIR spectrometer and cured at a low radiant flux of 5 mW/cm$^2$ and real time conversion data was collected as shown in FIG. 10 and Table 1. This process was repeated with BlueSky Armor™ 1047 Clear Top Coat and the wet slide was placed in the Nicolet FTIR spectrometer and cured at a low radiant flux of 10 mW/cm$^2$ and real time conversion data was collected as shown in FIG. 10 and Table 1. This process was repeated with BlueSky Armor™ 1047 Clear Top Coat and the wet slide was placed in the Nicolet FTIR spectrometer and cured at a low radiant flux of 20 mW/cm$^2$ and real time conversion data was collected as shown in FIG. 10 and Table 1.

Figure 11:
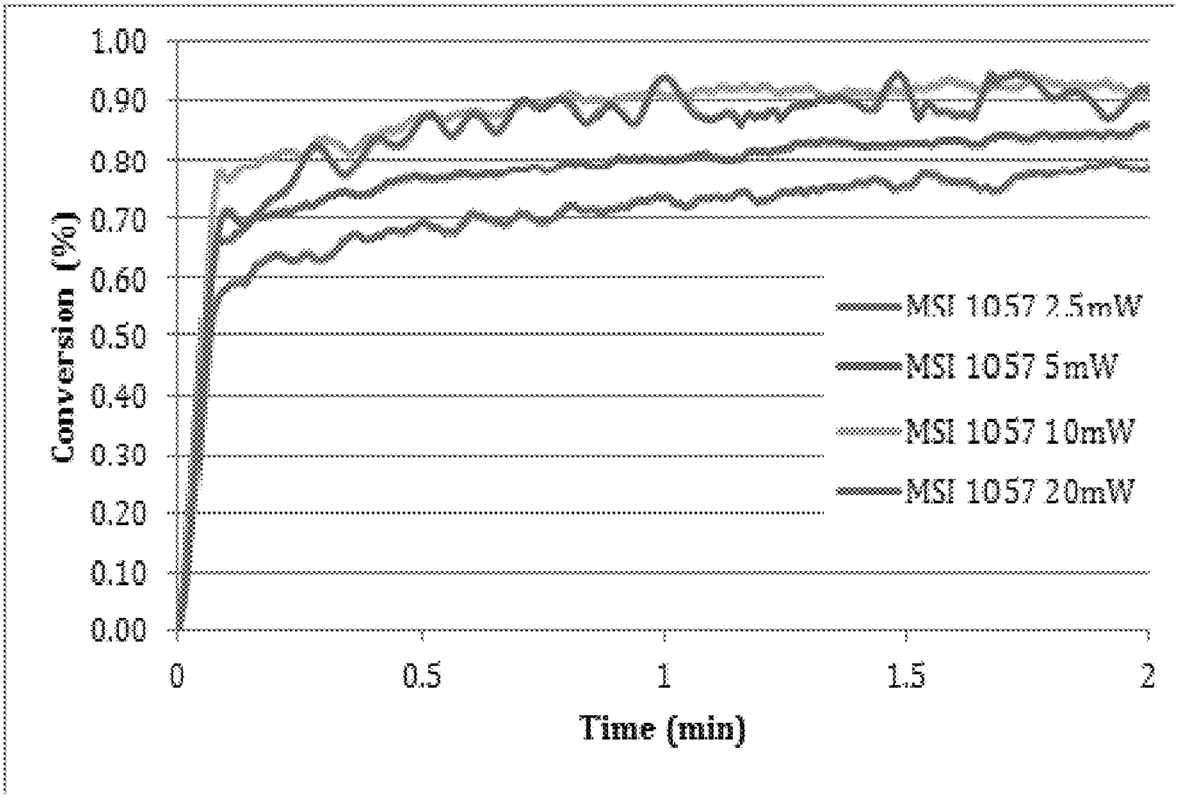
FIG. 11 illustrates an acrylate conversion versus time at various low radiation fluxes according to Example 4.

BlueSky Armor™ 1057 Clear Top Coat uncured material was placed on Corning 2947-75X25 Soda Lime Glass Plain Microscope Slide that was 75 mm Length×25 mm Width×0.90-1.10 mm thick. The uncured material was drawn down across the slide with an AccuDyne #100 wire-wound metering rod, so that the slide was completely and uniformly covered with the wet material to a thickness of about 0.25 mm. Next, the wet slide was placed in the Nicolet FTIR spectrometer and cured at a low radiant flux of 2.5 mW/cm$^2$ and real time conversion data was collected as shown in FIG. 11 and Table 1. This process was repeated with BlueSky Armor™ 1057 Clear Top Coat and the wet slide was placed in the Nicolet FTIR spectrometer and cured at a low radiant flux of 5 mW/cm$^2$ and real time conversion data was collected as shown in FIG. 11 and Table 1. This process was repeated with BlueSky Armor™ 1057 Clear Top Coat and the wet slide was placed in the Nicolet FTIR spectrometer and cured at a low radiant flux of 10 mW/cm$^2$ and real time conversion data was collected as shown in FIG. 11 and Table 1. This process was repeated with BlueSky Armor™ 1057 Clear Top Coat and the wet slide was placed in the Nicolet FTIR spectrometer and cured at a low radiant flux of 20 mW/cm$^2$ and real time conversion data was collected as shown in FIG. 11 and Table 1.

TABLE 1

| Acrylate conversion for each product at each intensity. | | | | |
|---|---|---|---|---|
| Formulation | 2.5 mW/cm$^2$ | 5 mW/cm$^2$ | 10 mW/cm$^2$ | 20 mW/cm$^2$ |
| MSI 1007 | 80% | 84% | 92% | 94% |
| MSI 1027 | 81% | 88% | 96% | 95% |
| MSI 1047 | 76% | 82% | 91% | 90% |
| MSI 1057 | 80% | 86% | 91% | 90% |

Next, the time to tack free curing in an oxygen environment at varying low radiant flux energies was determined for each of the following BlueSky Armor™ 1007 Clear Top Coat, BlueSky Armor™, 1027 Clear Top Coat, BlueSky Armor™ 1047 Clear Knife Grade Filler, and BlueSky Armor™ 1057 Laminating Resin. The low radiant flux energies at the surface of the curing were tested were 2.5 mW/cm$^2$, 5 mW/cm$^2$, 10 mW/cm$^2$, and 20 mW/cm$^2$. The same energy sources described above were used.

BlueSky Armor™ 1007 Clear Top Coat uncured material was placed on Corning 2947-75X25 Soda Lime Glass Plain Microscope Slide that was 75 mm Length×25 mm Width×0.90-1.10 mm thick. The uncured material was drawn down across the slide with an AccuDyne #100 wire-wound metering rod, so that the slide was completely and uniformly covered with the wet material to a thickness of about 0.25 mm. Next, the wet slide was cured at a low radiant flux at the surface of 2.5 mW/cm$^2$ and the quality of cure was checked every 15 s by touching the surface of the sample. If the sample was marred in anyway the cure was considered tacky. This process was repeated at 5 mW/cm$^2$, 10 mW/cm$^2$, and 20 mW/cm$^2$ results are shown in Table 2. The process was also repeated for 1027 Clear Top Coat, BlueSky Armor™ 1047 Clear Knife Grade Filler, and BlueSky Armor™ 1057 Laminating Resin at the low radiant flux energies at the surface of the curing were tested were 2.5 mW/cm$^2$, 5 mW/cm$^2$, 10 mW/cm$^2$, and 20 mW/cm$^2$ and results shown in Table 2.

TABLE 2

| Time to tack free | | | | |
|---|---|---|---|---|
| Formulation | 2.5 mW/cm$^2$ | 5 mW/cm$^2$ | 10 mW/cm$^2$ | 20 mW/cm$^2$ |
| MSI 1007 | >5 min | 2 min | 70 s | 40 s |
| MSI 1027 | >5 min | 2 min | 90 s | 40 s |
| MSI 1047 | >5 min | 105 s | 80 s | 50 s |
| MSI 1057 | >5 min | 2 min | 90 s | 40 s |

Next, the viscosity, tensile properties, flexural properties, shore hardness and solvent resistance were measured for the BlueSky Armor™ 1007 Clear Top Coat, BlueSky Armor™, 1027 Clear Top Coat, BlueSky Armor™ 1047 Clear Knife Grade Filler, and BlueSky Armor™ 1057 Laminating Resin from MSI Coatings, Inc. out of Boulder, Colorado.

The viscosity was measured with a model DV-II Brookfield viscometer using #31 or #18 spindle at 25° C. using the small sample adapter with volumes of about 5 mL to about 16 mL where appropriate. The tensile properties were obtained from fabricating samples from laminating Teflon molds that had a gauge length of 35 mm, width of 6 mm and thickness of 1 mm between glass slides and cured with a 395-410 nm 150 W LED light at 10 mW/cm$^2$ for 2 minutes. Samples were pulled at 10 mm/min following ASTM D638-10 standard, which is hereby incorporated by reference. The results are shown in Table 3.

The flexural properties were obtained and made from laminating Teflon molds that having a gauge length of 35 mm, width of 6 mm and thickness of 1 mm between glass slides teflon molds that had dimensions of 22×2.2×2.5 mm and cured at a wavelength of about 395 nm to about 410 nm with a 150 W LED light at low radiant energy flux at the surface of 10 mW/cm$^2$ for 2 minutes. Samples were bent at 1 mm/min following the ASTM D790-03 standard, which is hereby incorporated by reference. The results are shown in Table 3. The shore hardness were obtained from samples drawn down with an AccuDyne #100 wire wound bar. Shore hardness was measured with Shore A and D durometers. The results are shown in Table 3. The solvent resistance was obtained with MEK double rubs performed using ASTM D540-93 standard, which is hereby incorporate by reference.

TABLE 3

Summary of characteristic data. Standard deviations are in parentheses.

| Property | MSI 1007 | MSI 1027 | MSI 1047 | MSI 1057 | Vinyl ester | Epoxy |
|---|---|---|---|---|---|---|
| Viscosity at 25° C. (cps) | 100 | 32 | Paste | 300 | 530-1300 (30-3 rpm) | 800 |
| Tensile Modulus (mPa) | 750 (100) | 160 (10) | 1400 (100) | 900 (100) | 1160 (70) | 1500 (50) |
| Tensile Strength (mPa) | 29 (7) | 14 (2) | 23 (4) | 35 (5) | 40 (3) | 60 (5) |
| Tensile Elongation | 6 (2) | 20 (5) | 3 (1) | 8 (2) | 6 (2) | 4 (2) |
| Flexural Modulus (mPa) | 1050 (100) | 150 (20) | 1250 (70) | 1100 (90) | 1200 (150) | 1650 (200) |
| Flexural Strength (mPa) | 39 (4) | 5.5 (1) | 46 (4) | 41 (3) | 46 (6) | 61 (10) |
| Flexural Elongation | 17 (3) | 35 (10) | 16 (5) | 18 (8) | 27 (8) | 30 (1) |
| MEK double rubs | 200+ | 200+ | 200+ | 200+ | 1 | 200+ |
| Shore hardness | 73D | 60D | 75D | 82D | 80D | 84 |

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A premanufactured aerospace apparatus, comprising:

a honeycomb substrate having a first surface and opposite second surface;

a decorative material on the first surface of the honeycomb substrate; and a radiation cured coating on the decorative material, the radiation cured coating obtained by curing a VOC free low radiant flux UV curable material comprising an acrylate monomers/oligomers; a thiol monomers/oligomers; a photo initiator; and a radical inhibitor with a radiation energy source in a range from 360 nm to 420 nm at a surface power density of less than 40 mW/cm2.

2. The premanufactured aerospace apparatus of claim 1, wherein the honeycomb substrate comprises a panel comprising a material selected from the group consisting of alloy, aluminum alloy, fiberglass, carbon fiber, thermoplastic, wood, metal and combinations of the same.

3. The premanufactured aerospace apparatus of claim 2, wherein the decorative material is a wood veneer.

4. The premanufactured aerospace apparatus of claim 3, wherein the wood veneer further comprises a fire retardant one of the first surface or the second surface.

5. The premanufactured aerospace apparatus of claim 3, wherein the decorative material comprises one or more of an organic pigmented material and a synthetic pigmented material.

6. The premanufactured aerospace apparatus of claim 3, wherein the decorative materials comprises one or more of a glitter material, a metallic flake material, a thermoplastic flake material, a bead material, a glass material, a decal, a sticker, an organic pigmented material, and a synthetic pigmented material.

7. The premanufactured aerospace apparatus of claim 3, wherein the radiation cured coating wherein the radiation cured coating is resistant to an acid having a pH of less than 1.

8. The premanufactured aerospace apparatus of claim 3, wherein the radiation cured coating is fire retardant and passes a sixty second vertical flame test having a burn length of less than 1.6 inches after sixty seconds.

9. The premanufactured aerospace apparatus of claim 7, wherein pH of less than 3.

10. The premanufactured aerospace apparatus of claim 3, wherein the decorative materials comprises a graphic design.

11. A premanufactured aerospace panel, comprising:

an aerospace substrate having a first surface and opposite second surface;

a decorative material on the first surface of the aerospace substrate; and a radiation cured coating on the decorative material, the radiation cured coating obtained by curing a VOC free low radiant flux UV curable material comprising an acrylate monomers/oligomers; a thiol monomers/oligomers; a photo initiator; and a radical inhibitor with a radiation energy source in a range from 360 nm to 420 nm at a surface power density of less than 40 mW/cm2.

12. The premanufactured aerospace panel of claim 11, wherein the aerospace substrate comprises a composite honeycomb panel.

13. The premanufactured aerospace panel of claim 12, wherein the aerospace substrate comprises an alloy panel.

14. The premanufactured aerospace panel of claim 11, wherein the decorative material comprises a veneer material comprises a wood material.

15. The premanufactured aerospace panel of claim 14, wherein the wood material further comprises a fire retardant on one or more of a first surface and second opposite surface of the wood veneer.

16. The premanufactured aerospace panel of claim 11, wherein the radiation cured coating is non-permeable.

17. The premanufactured aerospace panel of claim 11, wherein the radiation cured coating is a fire retardant and is configured to pass an aerospace sixty second vertical flammability test with a flame time of zero seconds and drip flame time of zero seconds.

18. The premanufactured aerospace panel of claim 11, wherein the thiol monomers/oligomers comprises one or more of ethylene glycol bis(thioglycolate), ethylene glycol bis(3-mercaptopropionate), pentaerythritol tetra(3-mercaptopropionate), trimethylolpropane tris(3-mercaptopropionate), pentaerythritol tetra(2-mercaptoacetate), trimethylolpropane tris(2-mercaptoacetate), 1,6-hexanedithiol, 1,2-benzenedithiol, 1,3-benzenedithiol, isophorone diurethane thiol, and combinations thereof.

19. The premanufactured aerospace panel of claim 11, wherein the acrylate monomers/oligomers comprises one or more of ethylene glycol di(meth)acrylate, tetraethyleneglycol-di(meth)acrylate, poly(ethylene glycol) dimethacrylates, a condensation product of bisphenol A and glycidyl methacrylate, 2,2'-bis [4-(3-methacryloxy-2-hydroxypropoxy)-phenyl]propane, hexanediol di(meth)acrylate, tripropylene glycol di(meth)acrylate, butanediol di(meth)acrylate, neopentyl glycol di(meth)acrylate, diethylene glycol di(meth) acrylate, triethylene glycol di(meth)acrylate, dipropylene glycol di(meth)acrylate, allyl (meth)acrylate trimethylolpropane triacrylate, tris(2-hydroxy ethyl) isocyanurate triacrylate, tricyclodecane dimethanol diacrylate, and combinations thereof.

20. The premanufactured aerospace apparatus of claim 11, wherein the decorative material is a wood veneer.

21. The premanufactured aerospace apparatus of claim 11, wherein the wood veneer further comprises a fire retardant one of the first surface or the second surface.

22. The premanufactured aerospace apparatus of claim 11, wherein the decorative material comprises one or more of an organic pigmented material and a synthetic pigmented material.

23. The premanufactured aerospace apparatus of claim 11, wherein the decorative materials comprises one or more of a glitter material, a metallic flake material, a thermoplastic flake material, a bead material, a glass material, a decal, a sticker, an organic pigmented material, and a synthetic pigmented material.

24. The premanufactured aerospace apparatus of claim 11, wherein the radiation cured coating wherein the radiation cured coating is resistant to an acid having a pH of less than 1.

25. The premanufactured aerospace apparatus of claim 11, wherein the radiation cured coating is fire retardant and passes a sixty second vertical flame test having a burn length of less than 1.6 inches after sixty seconds.

26. The premanufactured aerospace apparatus of claim 11, wherein the decorative materials comprises a graphic design.

27. A premanufactured aerospace panel, comprising:

a honeycomb aerospace composite substrate having a first surface and opposite second surface;

a wood veneer material adhered to the first surface of the honeycomb aerospace composite substrate and a tack free, fire retardant, VOC free, UV cured clear coating on the wood veneer material comprising an acrylate monomers/oligomers; a thiol monomers/oligomers; a photo initiator; and a radical inhibitor, wherein the cured coating is a fire retardant and clear coat configured to pass a aerospace sixty second vertical flammability test with a flame time of zero seconds and drip flame time of zero seconds.

28. The premanufactured aerospace panel of claim 27, wherein the wood veneer material comprises a wood stain.

29. The premanufactured aerospace panel of claim 27, wherein the wood veneer material comprises a natural wood veneer.

30. The premanufactured aerospace panel of claim 27, wherein the tack free, fire retardant, VOC free, UV cured clear coating is non-permeable.

31. The premanufactured aerospace panel of claim 27, wherein the tack free, fire retardant, VOC free, UV cured clear coating has one of a satin finish, a gloss finish, and a flat finish.

32. The premanufactured aerospace apparatus of claim 27, wherein the tack free, fire retardant, VOC free, UV cured clear coating is corrosive resistant to an acid having a pH of less than 1.

33. The premanufactured aerospace apparatus of claim 27, wherein the tack free, fire retardant, VOC free, UV cured clear coating is a fire retardant and passes a sixty second vertical flame test having a burn length of less than 1.6 inches after sixty seconds.

* * * * *